United States Patent
Somal

(10) Patent No.: US 12,299,647 B2
(45) Date of Patent: May 13, 2025

(54) ELECTRONIC RECEIPT TRANSMITTAL APPARATUS AND METHOD

(71) Applicant: Fastr Tech Inc., East Meadow, NY (US)

(72) Inventor: Shashank Somal, East Meadow, NY (US)

(73) Assignee: Fastr Tech Inc., East Meadow, NY (US)

( * ) Notice: Subject to any disclaimer, the term of this patent is extended or adjusted under 35 U.S.C. 154(b) by 469 days.

(21) Appl. No.: 17/576,350

(22) Filed: Jan. 14, 2022

(65) Prior Publication Data

US 2022/0230145 A1 Jul. 21, 2022

Related U.S. Application Data

(60) Provisional application No. 63/138,350, filed on Jan. 15, 2021.

(51) Int. Cl.
*G06Q 20/04* (2012.01)
*G06Q 20/20* (2012.01)
(Continued)

(52) U.S. Cl.
CPC ......... *G06Q 20/047* (2020.05); *G06Q 20/202* (2013.01); *H04B 5/72* (2024.01); *H04L 51/08* (2013.01)

(58) Field of Classification Search
CPC ...... G06Q 20/047; G06Q 20/202; H04B 5/72; H04L 51/08
See application file for complete search history.

(56) References Cited

U.S. PATENT DOCUMENTS 8,738,454 B2 5/2014 Argue et al.
8,831,981 B2 9/2014 Cheng
(Continued)

FOREIGN PATENT DOCUMENTS

WO 2004090819 A2 10/2004
WO 20080002260 A1 1/2008

OTHER PUBLICATIONS

Quotient, The Result of Knowing, downloaded from https://www.quotient.com/, Nov. 2020, 7 pgs.
(Continued)

*Primary Examiner* — A. Hunter Wilder
*Assistant Examiner* — Joseph M Mutschler
(74) *Attorney, Agent, or Firm* — Hard IP LLC

(57) ABSTRACT

An electronic receipt generator and method to provide an electronic receipt to a user device is described. The electronic receipt generator receives receipt information from a Point of Sale system, applies a filter to remove undesired information, formats the receipt information, injects injectable information, encrypts the receipt, and transmits the encrypted receipt to a user device. The electronic receipt generator may also print a physical receipt copy. The electronic receipt generator transmits the encrypted receipt to a user device using a contactless data transfer technology. A portable data card may be used to transfer a receipt to a remote user. The electronic receipt generator also transmits the encrypted receipt to an application server. The application server compiles injectable information tailored to a user device according to machine instructions. The application server decrypts the encrypted receipt and transmits the electronic receipt to the user device.

11 Claims, 17 Drawing Sheets

(51) Int. Cl.
*H04B 5/72* (2024.01)
*H04L 51/08* (2022.01)

(56) References Cited

U.S. PATENT DOCUMENTS

| | | |
|---|---|---|
| 2008/0167000 A1 | 7/2008 | Wentker et al. |
| 2012/0030066 A1 | 2/2012 | Stringfellow et al. |
| 2012/0316950 A1 | 12/2012 | LaPorte et al. |
| 2015/0254633 A1 | 9/2015 | Nishizawa |
| 2019/0272555 A1 | 9/2019 | Boal |
| 2020/0034800 A1* | 1/2020 | Haketa ................. G06Q 20/202 |
| 2020/0034802 A1* | 1/2020 | Chopra ................. G06Q 20/047 |
| 2021/0049576 A1* | 2/2021 | Anson ................. G06Q 20/209 |

OTHER PUBLICATIONS

Coupons.com, downloaded from https://www.coupons.com/ on Jan. 14, 2022, 1 pg.
International Application No. PCT/US2022/012501, International Search Report and Written Opinion mailed Apr. 28, 2022, 7 pages.

* cited by examiner

12,299,647 B2

ELECTRONIC RECEIPT TRANSMITTAL APPARATUS AND METHOD

CROSS REFERENCE TO RELATED APPLICATION

This application claims the benefit under 35 U.S.C. § 119(e) of the filing date of U.S. provisional application No. 63/138,350 filed on Jan. 15, 2021, the content of which is incorporated herein by reference in its entirety.

FIELD

This disclosure relates to an electronic receipt transmittal apparatus and method and, in particular, to an electronic receipt generator integrated into a commercial Point of Sale for transmitting an electronic receipt to a user.

BACKGROUND

In commercial transactions, it is common practice to provide a customer with a proof of purchase, or receipt. These receipts are used to confirm the details of a transaction and may include any information the business considers pertinent, such as the items bought by the user, date of purchase, total charges, applicable sales taxes, and identifying information for the store. The bearer of a receipt may use the information the receipt contains to facilitate post-sale activities such as dividing the charges between themselves and others ("splitting the bill"), product returns, customer surveys, tax deductions, or registration of a purchased product. Increasingly, receipts are also being used to make post-sale offers to the customer including coupons and offer codes.

The typical system for conducting a business transaction in physical store locations is known as a Point of Sale (POS) system. A POS system integrates a set of hardware components intended to fulfill the particular transactional requirements of a business. For example, a common POS system used for retail business integrates a general-purpose computer with a network connection, a mouse, a keyboard, a monitor screen, a credit card reader, a cash drawer, and a receipt printer. Depending on the type of business transactions to be conducted, other accessories may be added, such as a barcode reader, a badge reader, or a digital scale.

A common form of receipt delivery system used by businesses for on-site transactions in physical locations is printing on paper. POS systems typically include a means to integrate a receipt printer for this purpose. In a common implementation, receipts are printed using a direct thermal printer by heating a coated thermochromic paper. Direct thermal printing is often used for paper receipts due to its relatively low cost, high speed, and the mechanical simplicity of the printer. However, the thermochromic paper used for paper receipts may contain some amount of the chemical bisphenol A (BPA), which has been associated with environmental concerns.

The printing of paper receipts is associated with a measurable cost, both to the business and to the environment. Businesses bear the cost of maintaining and resupplying their print-based receipt delivery systems. Many customers already receive a high volume of printed receipts, and customers frequently discard their receipts without regard for their importance. An excess of discarded receipts may contribute unfavorably to landfill use and deforestation, and this excess represents a potential for reducing business operating costs while reducing harm to the environment. The presence of BPA in some thermochromic paper used for paper receipts also increases their potential as a health hazard for those customers who retain them. Furthermore, use of hand sanitizer to eliminate germs and viruses has become fairly common practice. However, handling of receipts after using hand sanitizer has been found to be dangerous. An outer layer of thermal receipt paper may contain high levels of free BPA. Some commonly used hand sanitizers, as well as other skin care products, contain mixtures of dermal penetration enhancing chemicals that can increase by up to 100 fold the dermal absorption of lipophilic compounds such as BPA. One study found that when a person held thermal receipt paper immediately after using a hand sanitizer with penetration enhancing chemicals, significant free BPA was transferred to their hands.

Finally, even for these customers who attempt to retain paper receipts, the physical slip of paper upon which the receipt is printed may be misplaced or damaged before the customer requires the information contained therein. While transaction details are frequently maintained by businesses in some form of data storage, a customer seeking a replacement for a paper receipt may not be able to recall specific details required to retrieve and reproduce the paper receipt. As a result, any post-sale activities requiring a proof of sale may be hindered by a loss of the paper receipt.

BRIEF DESCRIPTION OF THE DRAWINGS

The present disclosure is illustrated by way of example, and not by way of limitation, in the figures of the accompanying drawings.

DETAILED DESCRIPTION

Figure 1:
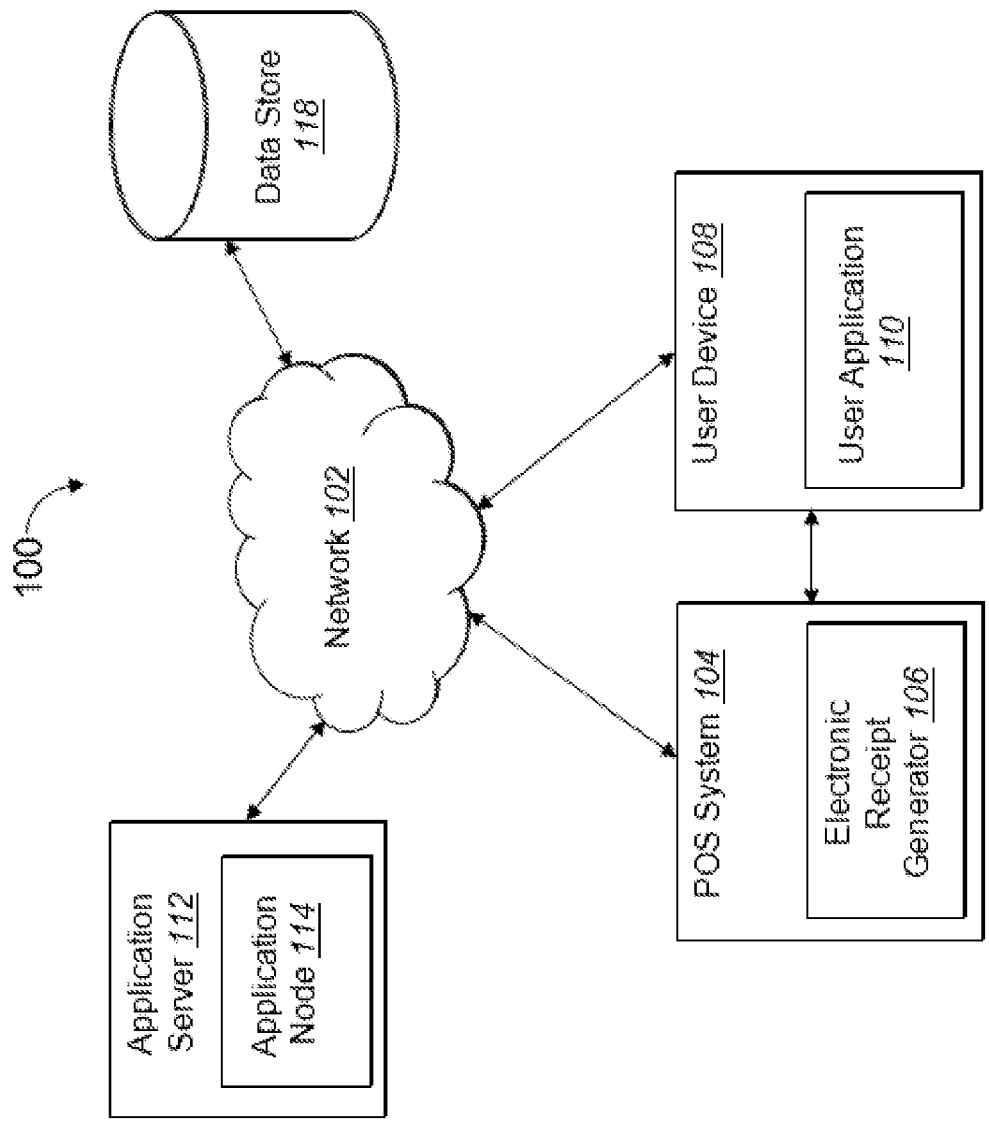
FIG. 1 illustrates an electronic receipt transmittal system architecture, in accordance with an implementation of the disclosure.

Before the present subject matter is described in detail, it is to be understood that this disclosure is not limited to the particular implementations described, as such may vary. It should also be understood that the terminology used herein is to describing particular implementations only, and is not intended to be limiting, since the scope of the present disclosure will be limited only by the appended claims. While this disclosure is susceptible to different implementations in different forms, there is shown in the drawings and will here be described in detail a preferred implementation of the disclosure with the understanding that the present disclosure is to be considered as an exemplification of the principles of the disclosure and is not intended to limit the broad aspect of the disclosure to the implementation illustrated. All features, elements, components, functions, and steps described with respect to any implementation provided herein are intended to be freely combinable and substitutable with those from any other implementation unless otherwise stated. Therefore, it should be understood that what is illustrated is set forth only for the purposes of example and should not be taken as a limitation on the scope of the present disclosure.

In the following description and in the figures, like elements are identified with like reference numerals. The use of "e.g.," "etc.,", "or" and "the like" indicates non-exclusive alternatives without limitation, unless otherwise noted. The use of "having", "comprising", "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one implementation, to A only (optionally including entities other than B); in another implementation, to B only (optionally including entities other than A); in yet another implementation, to both A and B (optionally including other entities). These entities may refer to elements, actions, structures, steps, operations, values, and the like.

As used herein, the term "receipt" means a text document acknowledging that money has been received by a merchant in payment for a transfer of goods or provision of a service. A receipt may also contain any additional information the merchant elects including, but not limited to, aspects of the merchant, a customer, or circumstances of the payment. Laws in some jurisdictions require that a receipt be provided to customers, and some jurisdictions further specify information to be included on applicable receipts. While receipts have traditionally been printed on paper, the contents of a receipt may also be provided in the form of digital information. As used herein, the term "electronic receipt" means a receipt provided in the form of digital information.

Furthermore, the term "invoice" as used herein may refer to a bill or a list of goods or services provided. An invoice may include a statement of a sum of costs due for the listed items, including a subtotal of costs due, taxes, fees, discounts, and/or other applicable charges and/or credits and/or a total of costs due. The term "invoice" may be used to describe a document (electronic or paper) providing a sum of costs due before payment. The term "receipt" may be used to describe a document providing confirmation of payment for the sum of costs that were due. These terms may also be used interchangeably and details regarding an invoice may apply equally to details regarding a receipt and vice versa.

In an implementation, an invoice may be rendered and provided prior to a receipt. Receipts containing details to prove a payment may be useful to a consumer. For instance, a receipt may be useful as objective evidence supporting a tax deduction. A receipt is also often the primary document used to prove eligibility for a refund or a return of products to their vendor. Further, marketing offers such as coupons, surveys, or discounts may be included as an attachment to the body of a receipt.

As discussed above, in order to provide receipts to a user, a merchant often prints text representing a list of goods/services purchased, taxes, etc., along with a confirmation of payment received (and sometimes the method the payment was submitted, e.g., credit card, cash, debit card, gift card, etc.) onto paper. The merchant may then provide the paper receipt to the customer. The generation and distribution of paper receipts is disadvantageous in comparison to providing electronic receipts for many reasons including costs, environmental reasons, and others. First, the paper which a receipt is to be printed on is supplied by the merchant. Some receipt printers may also require a supply of ink. Lastly, the moving parts of a receipt printer wear over time, leading to a recurring cost of maintenance, repair, or replacement of the receipt printer.

Furthermore, printed receipts represent a potential source of environmental damage as well. Paper production may contribute unfavorably to deforestation, therefore, reducing the demand for paper may benefit the environment. Further, the chemical processes used to produce some varieties of receipt paper prevents them from being recyclable. Compounding this fact, many paper receipts are discarded by customers and contribute to litter.

Even when a customer retains a printed receipt, the printed receipt has several drawbacks in comparison to an electronic receipt. The presence of bisphenol A (BPA) in some thermochromic paper used for paper receipts indicates their potential as a health hazard when handled by a human. This hazard may also be exacerbated in the presence of hand sanitizer, according to some research. Further, a printed receipt may be lost, damaged, or discarded, nullifying its usefulness in that circumstance.

The present disclosure addresses these deficiencies by providing an electronic receipt transmittal system and method that not only eliminates the cost of paper but also ensures secure storage of the receipts for later use by a customer. The electronic receipt transmittal system includes an electronic receipt generator, an application server, a network, a Point of Sale (POS) system, and an application running on a user device. The electronic receipt transmittal system may also include a portable data card. An electronic receipt generator is coupled to or otherwise connects to a POS system. A network may be used to transmit data between any of the components connected thereto. The electronic receipt generator receives data for a receipt from the POS system and may generate an electronic receipt, and filter, format, and/or encrypt the electronic receipt. For example, the electronic receipt generator may filter out multimedia such as rich text, pictures, photographs, logos, etc., from the electronic receipt to conserve bandwidth before transmission of the electronic receipt. The electronic receipt generator transmits the electronic receipt to an application server. The electronic receipt generator may also transmit the electronic receipt directly to an application running on a user device and/or a portable data card. The application server transmits an electronic receipt to an application running on a user device upon request. Prior to the transmission, the application server may format the electronic receipt to input rich text, pictures, photographs, logos, etc.

The present disclosure is further advantageous to businesses because the data retained by the server could be useful in targeted marketing campaigns. The electronic receipts associated with a particular user contain a history of their spending habits which may be analyzed for purchase analytics and/or marketing insights. Additionally, the present disclosure enables the server to add content to an electronic receipt as part of its formatting instructions. This additional content may be used to direct marketing campaigns such as offers, coupons, and surveys. Further, this additional content may be used to supply a user with information derived from purchase data, such as an integration with a budget application or guidance to the user on spending their money more efficiently.

The present disclosure is further advantageous to users because an electronic receipt may be used for post-transaction activities. For example, an electronic receipt may enable a user to divide or split the responsibility for payment of a bill between themselves and others. In an implementation, a user application running on a user device includes features for splitting a bill based on one or more of even shares, item-based splitting, multiple-based splitting, and/or a custom user selection. In another implementation, a user may request partial payment of a bill by another individual based on an electronic receipt using a Peer-to-Peer (P2P) payment platform, such as VENMO, ZELLE, CASHAPP, etc.

The present disclosure is further advantageous to businesses because a plurality of electronic receipt generators may be remotely managed and grouped using the Message Queuing Telemetry Transport (MQTT) protocol. In an implementation, the electronic receipt generators communicate with each other and/or with the application server via the MQTT protocol under a publisher/subscriber model. For example, suppose several thousand electronic receipt generators are operational in a large city. Using the publisher/subscriber model and MQTT, a business may make remote modifications to a subset of the operating electronic receipt generators, such as all electronic receipt generators in a given district without necessarily effecting others. In another example, the MQTT protocol enables a business to selectively choose what data is shared by a plurality of electronic receipt generators according to their criteria.

Various aspects of the above referenced system and method are described in detail herein below by way of examples, rather than by way of limitation.

FIG. 1 illustrates an electronic receipt transmittal system architecture 100, in accordance with an implementation of the disclosure. The electronic receipt transmittal system architecture 100 includes a network 102, a POS system 104, a user device 108, an application server 112, and a data store 118. The POS system 104 includes an electronic receipt generator 106. The user device 108 includes a user application 110. The application server 112 includes an application node 114. Although the electronic receipt generator 106 is depicted as being internal to the POS system 104, in other implementations, the electronic receipt generator 106 may be a receipt generator apparatus external to and coupled to or otherwise connected with the POS system 104. The POS system 104 and the electronic receipt generator 106 may establish bidirectional communication over a connection. The communication may be established via a wireless communication system (an 802.11 network, a Wi-Fi network, Universal Serial Bus (USB), a Bluetooth network, and/or a cellular network), a bus (an Ethernet network) and any protocol may be used in order to transfer data. Some examples of protocols include a clear text print protocol, an Epson Standard Code for Printers (ESC/POS) application protocol used in many receipt thermal printers, Internet Printing Protocol (IPP), AirPrint (for iOS and Mac host devices), Hewlett Packard (HP) JetDirect, etc.

In an implementation, network 102 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long-Term Evolution (LTE) network), routers, hubs, switches, server computers, and/or a combination thereof.

In an implementation, the data store 118 may be a memory (e.g., random access memory), a cache, a drive (e.g., a hard drive), a flash drive, a database system, or another type of component or device capable of storing data. The data store 118 may also include multiple storage components (e.g., multiple drives or multiple databases) that may also span multiple computing devices (e.g., multiple sever computers).

The user device 108 may include a computing device such as a personal computer (PC), a laptop, a mobile phone, a smart phone, a tablet computer, a netbook computer, a wearable device, etc. The user device 108 includes a user application 110. In an implementation, the user application 110 may be one or more applications that allow users to retrieve and view electronic receipts which may include text, images, videos, web pages, documents, etc. For example, the user application 110 may be a mobile based application that can access, retrieve, present, and/or navigate electronic invoices (e.g., bills) and/or receipts (e.g., presented in the form of web pages such as Hyper Text Markup Language (HTML) pages, digital media items, etc.) served by a web server. The user application 110 may render, display, and/or present the invoices and/or electronic receipts to a user employing the user device 108. The user application 110 may render, display, and/or present data such as purchase analytics to a user employing the user device 108.

In an implementation, the user application 110 is provided to the user device 108 by the application server 112. In another implementation, the user application 110 may be one or more applications that are downloaded from another server and/or mobile device package manager (e.g., via an application store). Although one user device 108 is shown, additional user devices than depicted may be used.

In general, functions described in one implementation as being performed by the application server 112 can also be performed on the user device 108 in other implementations if appropriate, and vice versa. In addition, the functionality attributed to a particular component can be performed by different or multiple components operating together. Furthermore, a component depicted in one figure may be utilized and/or substituted for another similar component in another figure.

In an implementation, the application server 112 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to electronic receipts and/or provide electronic receipts to the user device 108. The application server 112 may also include a website (e.g., a webpage) that may be used to provide a user with access to digital receipts. The application server 112 may include any type of content delivery network providing access to content and/or electronic receipts. The electronic receipt generator 106 may include a transmitting unit (not shown) configured to transmit electronic receipts to the application server 112 using a message protocol. In an implementation, the application server 112 communicates with the electronic receipt generator 106 using the Message Queuing Telemetry Transport (MQTT) protocol or the Hypertext Transfer Protocol (HTTP).

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, a user may be an automated ingestion pipeline (e.g., an application providing services such as bookkeeping, budget management, marketing, etc.) authorized to interact with the application server 112 on behalf of one or more individuals.

In situations in which the systems discussed here collect personal information about users, or may make use of personal information, the users may be provided with an opportunity to control whether the application server 112 collects user information (e.g., information about a user's social network, social actions or activities, profession, a user's preferences, or a user's current location), or to control whether and/or how to receive content from the application server 112 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the application server 112 and/or any other component of the electronic receipt transmittal system architecture 100.

Suppose that a user employing the user device 108 wishes to receive an electronic receipt after purchasing goods and/or items at a merchant's POS system (104). The user may submit electronic or paper payment for the goods and/or items to the merchant and the merchant may record the payment in the POS system 104. The POS system 104 may transmit data indicative of the list of purchased goods and/or items, applicable taxes, etc., to the electronic receipt generator 106. The electronic receipt generator 106 may then generate the electronic receipt as described herein.

The electronic receipt generator 106 may filter multimedia from the electronic receipt and encrypt the electronic receipt. The filtered and encrypted electronic receipt may be transmitted from the electronic receipt generator 106 to the application server 112 and to the user device 108. The user device 108 then transmits the filtered and encrypted electronic receipt to the application server 112 using a transmitting unit. In an implementation, the electronic receipt generator 106 includes a data storage unit configured to at least temporarily store an encrypted formatted electronic receipt in response to a failure of the transmitting unit. The application server 112, after realizing that the filtered and encrypted electronic receipt received from the user device 108 matches the one received from the electronic receipt generator 106, decrypts the electronic receipt, adds multimedia onto the electronic receipt and transmits it to the user device 108.

The user device 108 may then store and retain the electronic receipt. A user employing the user device 108 may view the electronic receipt on a display device of the user device 108.

In the FIG. 1 implementation, a user may be located in the vicinity of (close to, within a few feet of) the merchant's POS system (104). The user may thus provide payment at or near the POS system 104.

In other implementations, it may be advantageous for a user to obtain a receipt and/or an invoice even when the user is not located in the vicinity of the POS system. Such implementations are described herein with respect to FIG. 2.

Figure 2:
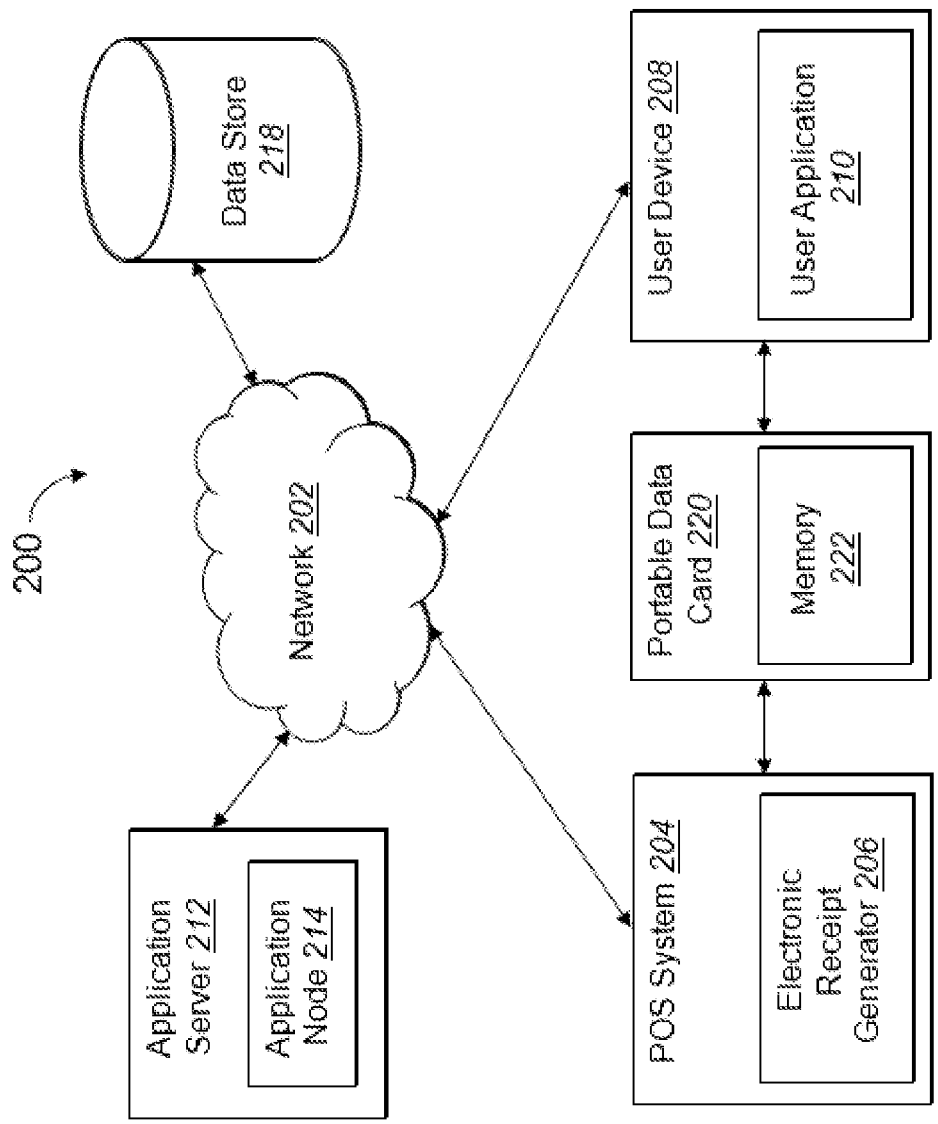
FIG. 2 illustrates an electronic receipt transmittal system architecture including a portable data card, in accordance with an implementation of the disclosure.

FIG. 2 illustrates an electronic receipt transmittal system architecture 200 including a portable data card, in accordance with an implementation of the disclosure. The electronic receipt transmittal system architecture 200 includes a network 202, POS system 204, user device 208, application server 212, a data store 218, and portable data card 220. The POS system 204 includes an electronic receipt generator 206. The user device 208 includes a user application 210. The application server 212 includes an application node 214. The portable data card 220 includes a memory 222.

Although the electronic receipt generator 206 is depicted as being internal to the POS system 204, in other implementations, the electronic receipt generator 206 may be external to and coupled to or otherwise connected with the POS system 204. The POS system 204 and the electronic receipt generator 206 may establish bidirectional communication over a connection. The electronic receipt generator 206 may include a transmitting unit configured to transmit data to the application server and/or a receiving unit configured to receive data from the POS system. The communication may be established via a wireless communication system (an 802.11 network, a Wi-Fi network, Universal Serial Bus (USB), a Bluetooth network, and/or a cellular network), a bus (an Ethernet network) and any protocol may be used in order to transfer data. Some examples of protocols include a clear text print protocol, an Epson Standard Code for Printers (ESC/POS) application protocol used in many receipt thermal printers, Internet Printing Protocol (IPP), AirPrint (for iOS and Mac host devices), Hewlett Packard (HP) JetDirect, etc. Some examples of data that may be transmitted or received include invoices, receipt information, injectable information, and encrypted formatted electronic receipts, etc.

In an implementation, network 202 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long-Term Evolution (LTE) network), routers, hubs, switches, server computers, and/or a combination thereof.

In an implementation, the data store 218 may be a memory (e.g., random access memory), a cache, a drive (e.g., a hard drive), a flash drive, a database system, or another type of component or device capable of storing data. The data store 218 may also include multiple storage components (e.g., multiple drives or multiple databases) that may also span multiple computing devices (e.g., multiple server computers).

The user device 208 may include a computing device such as a personal computer (PC), a laptop, a mobile phone, a smart phone, a tablet computer, a netbook computer, a wearable device, etc. The user device 208 includes user application 210. In an implementation, the user application 210 may be applications that allow users to retrieve and view electronic receipts which may include text, images, videos, web pages, documents, etc. For example, the user application 210 may be a mobile based application that can access, retrieve, present, and/or navigate electronic receipts (e.g., presented in the form of web pages such as Hyper Text Markup Language (HTML) pages, digital media items, etc.) served by a web server. The user application 210 may render, display, and/or present the electronic receipts to a user.

In an implementation, the user application 210 may be provided to the user device 208 by the application server 212. In another implementation, the user application 210 may be one or more applications that are downloaded from another server and/or mobile device package manager. Although user device 208 is shown, additional user devices may be used.

In general, functions described in one implementation as being performed by the application server 212 can also be performed on the user device 208 in other implementations if appropriate. In addition, the functionality attributed to a particular component can be performed by different or multiple components operating together.

In an implementation, the application server 212 may be computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to electronic receipts and/or provide electronic receipts to the user device 208. The application server 212 may also include a website (e.g., a webpage) that may be used to provide a user with access to digital receipts. The application server 212 may communicate with the electronic receipt generator 106 using a message protocol. In an implementation, the message protocol is the Message Queuing Telemetry Transport (MQTT) protocol. In another implementation, the message protocol is the Hypertext Transfer Protocol (HTTP). The application server 212 may include any type of content delivery network providing access to content and/or electronic receipts.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, a user may be an automated ingestion pipeline (e.g., an application providing services such as bookkeeping, budget management, marketing, etc.) authorized to interact with the application server 212 on behalf of individuals.

In situations in which the systems discussed here collect personal information about users, or may make use of personal information, the users may be provided with an opportunity to control whether the application server 212 collects user information (e.g., information about a user's social network, social actions or activities, profession, a user's preferences, or a user's current location), or to control whether and/or how to receive content from the application server 212 that may be more relevant to the user. In addition, certain data may be treated in ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the application server 212 and/or any other component of the electronic receipt transmittal system architecture 200.

The electronic receipt transmittal system architecture 200 includes portable data card 220 which may be configured to be transferrable to a user device 208. In an implementation, the portable data card 220 includes a memory 222 configured as a computer-readable storage medium such as Near-Field Communication (NFC) tags. The portable data card 220 may be configured to receive data using a contactless data transfer technology. As an example, a restaurant business may procure the portable data card 220 including the memory 222 embedded into a paper pamphlet printed with instructions for the user. An employee of the restaurant may carry the portable data card 220 to a user employing the user device 208.

Suppose for example that a user employing the user device 208 is seated at a table at a restaurant and is not in proximity to the POS system 204. The user may wish to obtain an electronic receipt for the payment of food. Upon confirmation of receipt of payment (submitted as paper or electronic payment), the POS system 104 may transmit data indicative of the list of purchased food items, applicable taxes, etc., to the electronic receipt generator 206. The electronic receipt generator 206 may then generate the electronic receipt as described herein.

The electronic receipt generator 206 may strip multimedia (also referred to as filtering) from the electronic receipt and encrypt the electronic receipt. The filtered and encrypted electronic receipt may be transmitted from the electronic receipt generator 206 to the application server 212. In addition, the filtered and encrypted electronic receipt electronic receipt is also transmitted from the electronic receipt generator 206 to the portable data card 220. As described above, an employee may then carry the portable data card 220 over to the user employing the user device 208.

The user device 208 then retrieves the filtered and encrypted electronic receipt electronic receipt from the portable data card 220 and forwards it to the application server 212. The application server 212, after realizing that the filtered and encrypted electronic receipt received from the user device 208 matches the one received from the electronic receipt generator 206, decrypts the electronic receipt, inputs multimedia onto the electronic receipt and transmits it to the user device 208.

The user device 208 may then store and retain the electronic receipt. A user employing the user device 208 may view the electronic receipt on a display device of the user device 208.

Figure 3:
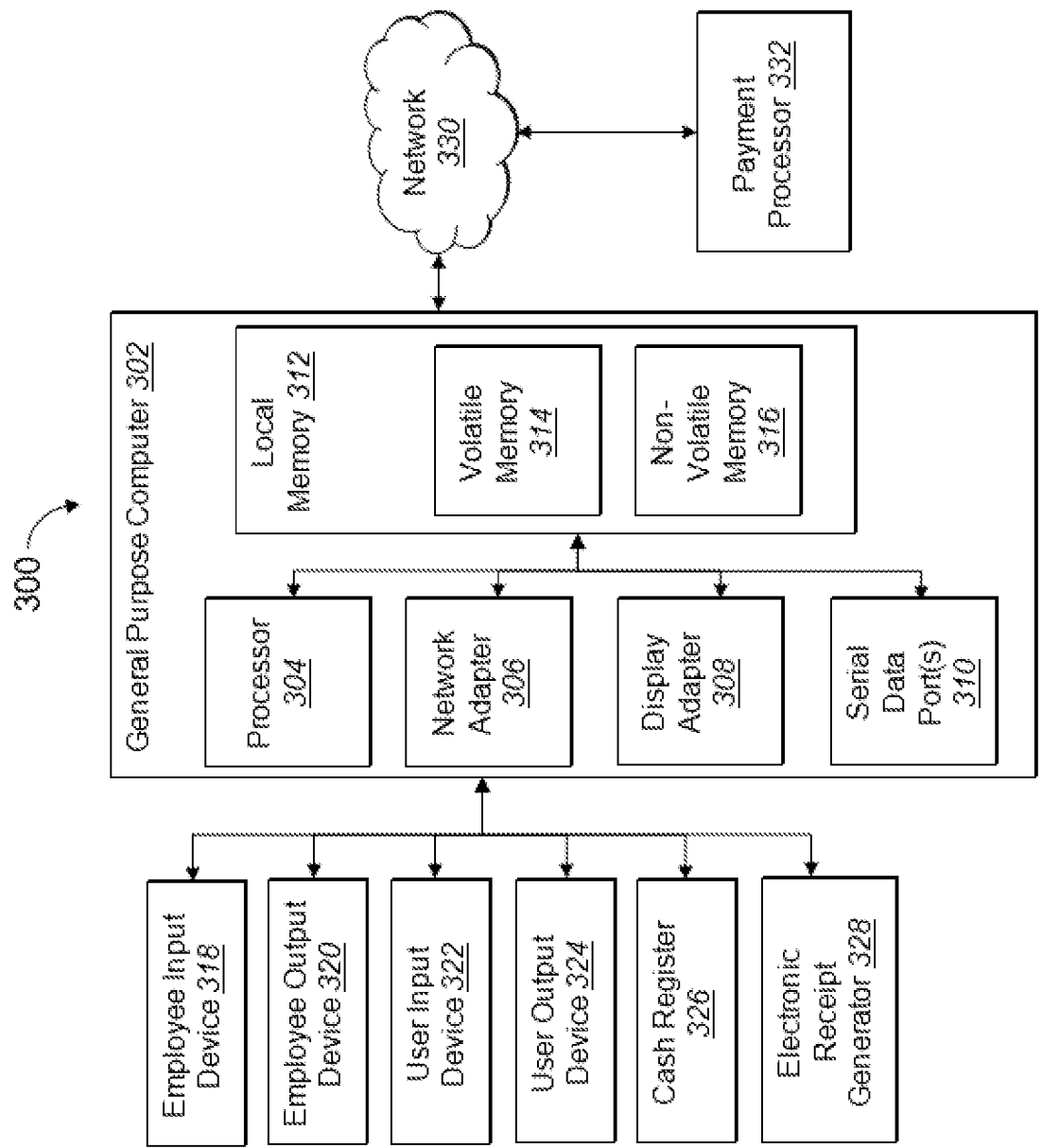
FIG. 3 illustrates a diagrammatic representation of a machine in the form of a POS system within which a set of instructions, for causing the machine to perform any of the methodologies discussed herein, may be executed.

FIG. 3 illustrates a diagrammatic representation of a machine in the form of a POS system 300 within which a set of instructions, for causing the machine to perform any of the methodologies discussed herein, may be executed. In alternative implementations, the machine may be connected (e.g., networked) to other machines in a LAN, an intranet, an extranet, or the Internet. The machine may operate in the capacity of a server or a user machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any of the methodologies discussed herein.

The POS system 300 includes a general-purpose computer 302, employee input devices 318, employee output devices 320, user input devices 322, user output devices 324, a cash register 326, an electronic receipt generator 328, and a network 330. The general-purpose computer 302 includes processor 304, network adapter 306, display adapter 308, serial data port 310, and a local memory 312. The network 330 may include a payment processor 332. The local memory 312 includes a volatile memory 314 (e.g., read-only memory (ROM), flash memory, dynamic random access memory (DRAM) such as synchronous DRAM (SDRAM) or Rambus DRAM (RDRAM), etc.) and a non-volatile memory 316.

The processor 304 represents general-purpose processing devices such as a microprocessor, central processing unit, or the like. More particularly, the processor 304 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 304 may also be special-purpose processing devices such as an application specific integrated circuit (ASIC), a field programmable gate array (FPGA), a digital signal processor (DSP), network processor, or the like. The processor 304 is configured to execute instructions for performing the operations and steps discussed herein.

The general-purpose computer 302 may further include network adapter 306 configured to enable communication over the network 330 using technologies such as Wi-Fi, Bluetooth, cellular data, or Ethernet. The network 330 may include connections to other services such as a payment processor 332, a data store 118 as described with respect to FIG. 1, a data store 218 as described with respect to FIG. 2, an application server 112 as described with respect to FIG. 1, and/or an application server 212 as described with respect to FIG. 2 in a Local Area Network (LAN), an intranet, an extranet, or the Internet. In an implementation, the payment processor 332 includes an application server configured to receive, process, and return the status of payment requests.

The general-purpose computer 302 also may include display adapter 308 configured to enable a video output to a liquid crystal display (LCD), light-emitting diode (LED), a cathode ray tube (CRT), or a touch screen using technologies such as Video Graphics Array (VGA), DisplayPort, or High-Definition Multimedia Interface (HDMI). The general-purpose computer 302 also may include serial data port 310 configured to enable data transfer between the general-purpose computer 302 and other devices capable of transmitting or receiving serial data or signals, using technologies such as Universal Serial Bus (USB) or digital to analog conversion.

The POS system 300 may further include employee input devices 318 and/or user input devices 322. As used herein, "input devices" means a device (e.g., a keyboard, a mouse, a touchscreen, a microphone, a camera, a badge reader, a digital scale, a barcode scanner, etc.) configured to convert physical phenomena (e.g., physical movement, light, sound, pressure, etc.) into computer-readable data. The POS system 300 may further include employee output devices 320 and/or user output devices 324. As used herein, "output devices" means a device (e.g., a video display, a speaker, a pair of headphones, a touchscreen, a buzzer, etc.) configured to convert computer-readable data into physical phenomena (e.g., physical movement, light, sound, pressure, etc.). In an implementation, the POS system 300 includes devices configured as both an input device and an output device. In an implementation, the POS system 300 includes input devices and/or output devices configured for use by either an employee or a user or both simultaneously.

The POS system 300 may further include a cash register 326. As used herein, "cash register" means a container configured to store and organize pieces of paper or metal currency. In an implementation, the cash register 326 may include an electronic lock and/or a drawer which may operate in response to commands issued by the general-purpose computer 302 in accordance with the instructions stored therein.

The POS system 300 includes the electronic receipt generator 328. Although the depicted implementation shows the general-purpose computer 302 as being external to the electronic receipt generator 328, in other implementations, the general-purpose computer may be internal to the electronic receipt generator 328 or the electronic receipt generator 328 may have a separate general-purpose computer.

In an implementation, the electronic receipt generator 328 includes a contactless data transfer technology including a computer-readable storage medium such as Near-Field Communication (NFC) tags. In an implementation, the electronic receipt generator 328 also includes an NFC tag writing device. In another implementation, the electronic receipt generator 328 includes one or more transmitters (not depicted) compatible with Bluetooth and/or Wi-Fi technologies. In another implementation, the electronic receipt generator 328 includes a user output device 324 configured to display a Quick Response (QR) code.

In an implementation, the electronic receipt generator 328 includes indicator devices such as light-emitting diodes (LEDs) configured to output information to a user by varying in illumination intensity or color. In an implementation, the electronic receipt generator 328 operates as instructions processed internally by the general-purpose computer 302. In another implementation, the electronic receipt generator 328 includes a general-purpose computer 302 configured to process the instructions for the operation of the electronic receipt generator 328. In an implementation, the electronic receipt generator 328 is configured to accept print requests from the general-purpose computer 302 using technologies such as Epson Standard Code for POS systems (ESC/POS), IPP (Internet Printing Protocol), AIRPRINT (for iOS and Mac host devices), HEWLETT PACKARD (HP) JETDIRECT, and/or JavaScript Object Notation (JSON).

The non-volatile memory 316 may include a computer-readable storage medium on which is stored sets of instructions (e.g., software) embodying any of the methodologies or functions described herein. The instructions may also reside, completely or at least partially, within the local memory 312 and/or the processor 304 during execution thereof by the general-purpose computer 302, the local memory 312 and the processor 304 also constituting computer-readable storage media. The instructions may further be transmitted or received over a network 330 via the network adapter 306.

In one implementation, the instructions include instructions for implementing a POS system 104 in FIG. 1 or the POS system 204 in FIG. 2. In another implementation, the instructions include instructions for implementing both a POS system 104 as described with respect to FIG. 1 and a POS system 204 as described with respect to FIG. 2. While the computer-readable storage medium previously mentioned is shown in an implementation to be a single medium, the term "computer-readable storage medium" should be taken to include a single medium or multiple media (e.g., a centralized or distributed database, and/or associated caches and servers) that store the sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "sending," "determining," "identifying," "presenting," "generating," "associating," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

Figure 4:
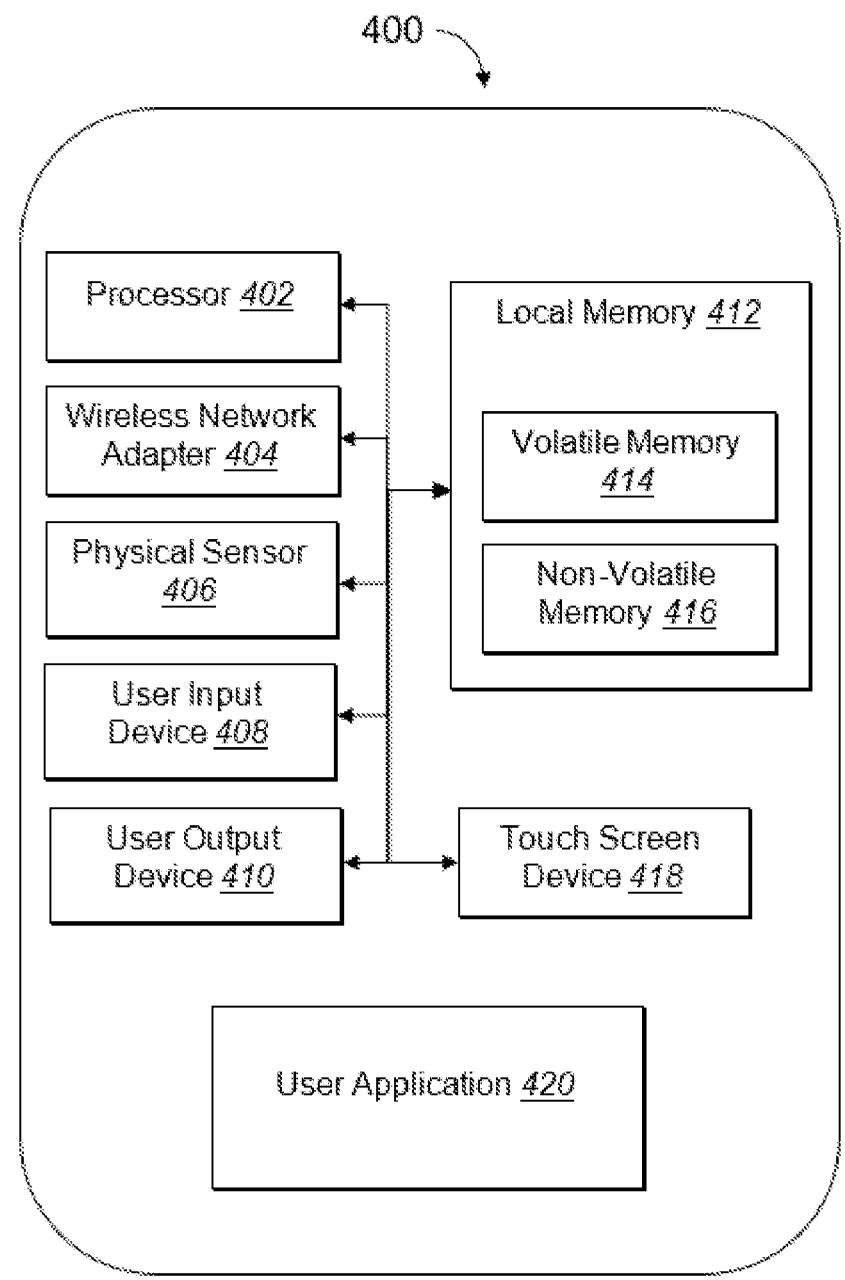
FIG. 4 illustrates a diagrammatic representation of a machine in the form of a user device within which a set of instructions, for causing the machine to perform any of the methodologies discussed herein, may be executed.

FIG. 4 illustrates a diagrammatic representation of a machine in the form of a user device 400 within which a set of instructions, for causing the machine to perform any of the methodologies discussed herein, may be executed. In alternative implementations, the machine may be connected (e.g., networked) to other machines in a LAN, an intranet, an extranet, or the Internet. The machine may operate in the capacity of a server or a user machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The user device 400 includes a processor 402, a wireless network adapter 404, physical sensors 406, user input devices 408, user output devices 410, a local memory 412, a touch screen device 418, and a user application 420. The local memory 412 includes a volatile memory 414 (e.g., read-only memory (ROM), flash memory, dynamic random access memory (DRAM) such as synchronous DRAM (SDRAM) or Rambus DRAM (RDRAM), etc.) and a non-volatile memory 416.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions for performing the operations and steps discussed herein.

The user device 400 may further include a wireless network adapter 404 configured to enable communication over a network (not depicted) using technologies such as Near-Field Communication (NFC), Wi-Fi, Bluetooth, or cellular data. The network (not depicted) may include connections to other services such as a payment processor 332, a data store 118 as described with respect to FIG. 1, a data store 218 as described with respect to FIG. 2, an application server 112 as described with respect to FIG. 1, and/or an application server 212 as described with respect to FIG. 2 in a Local Area Network (LAN), an intranet, an extranet, or the Internet.

In an implementation, the user device 400 includes physical sensors 406 (e.g., an accelerometer, a compass, a Global Positioning Signal (GPS) unit, etc.) configured to configured to convert ambient physical phenomena (e.g., physical movement, electromagnetism, light, sound, pressure, etc.) into computer-readable data.

The user device 400 may further include user input devices 408. As used herein, "input devices" means a device (e.g., a keyboard, a mouse, a touchscreen, a microphone, a camera, a badge reader, a digital scale, a barcode scanner, etc.) configured to convert one or more physical phenomena (e.g., physical movement, light, sound, pressure, etc.) into computer-readable data. The user device 400 may further include user output devices 410. As used herein, "output devices" means a device (e.g., a video display, a speaker, a pair of headphones, a touchscreen, a buzzer, etc.) configured to convert computer-readable data into one or more physical phenomena (e.g., physical movement, light, sound, pressure, etc.). In an implementation, the user device 400 includes one or more devices configured as both a user input device and a user output device. In an implementation, the user device 400 includes one or more graphical user interfaces to guide user interactions with the user input devices 408 and/or the user output devices 410. A graphical user interface may display a decrypted formatted electronic receipt to a user and may include interactable design elements (e.g., buttons, sliders, check boxes, menus, etc.) such that a user may solicit actions from the graphical user interface by interacting with the interactable design elements.

The non-volatile memory 416 may include a computer-readable storage medium on which is stored one or more sets of instructions (e.g., software) embodying any one or more of the methodologies or functions described herein. The instructions may also reside, completely or at least partially, within the local memory 412 and/or the processor 402 during execution thereof by the user device 400, the local memory 412 and the processor 402 also constituting computer-readable storage media. The instructions may further be transmitted or received over a network (not depicted) via the wireless network adapter 404.

In one implementation, the instructions include instructions for implementing a user device 108 or user device 208 in FIG. 1 and FIG. 2, respectively. While the computer-readable storage medium previously mentioned is shown in an implementation to be a single medium, the term "computer-readable storage medium" should be taken to include a single medium or multiple media (e.g., a centralized or distributed database, and/or associated caches and servers) that store one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "sending," "determining," "identifying," "presenting," "generating," "associating," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

Figure 5A:
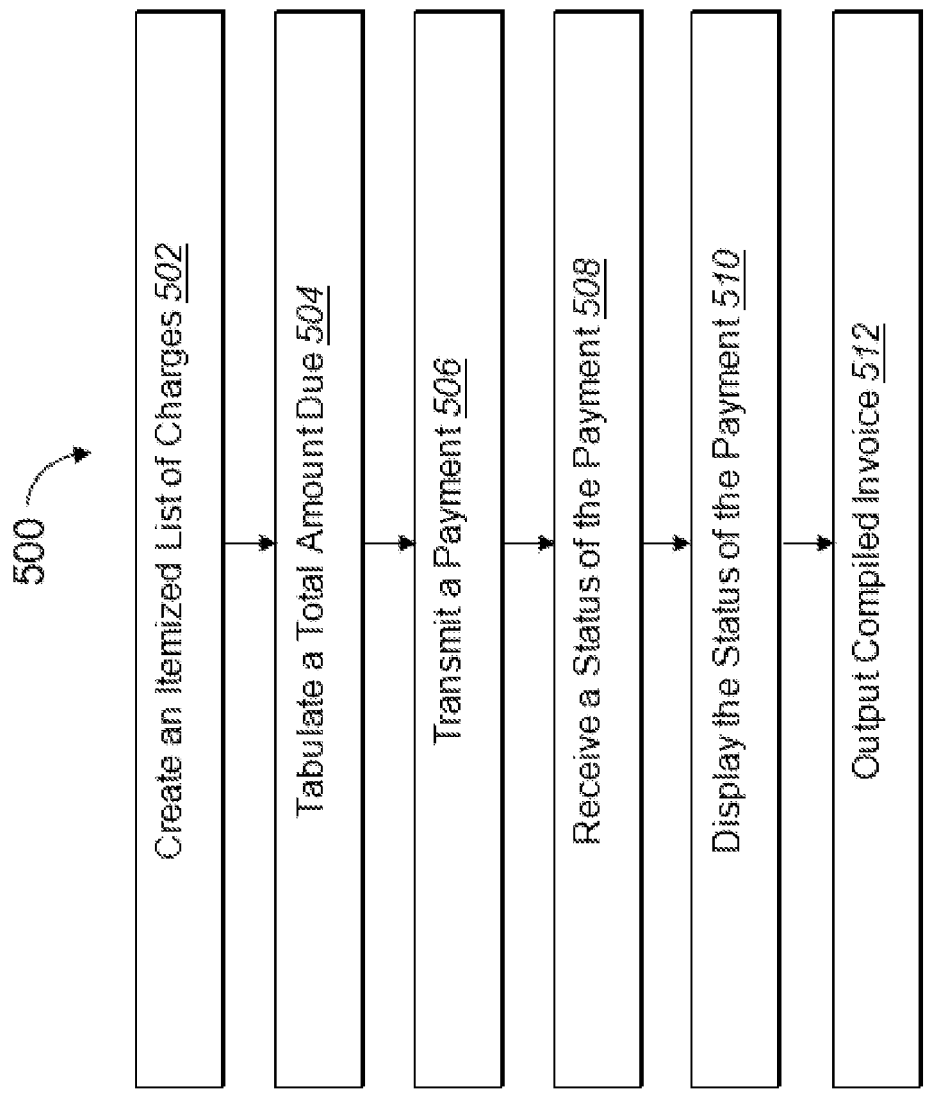
FIG. 5A is a flow diagram illustrating a method for receiving and transmitting an electronic receipt, according to an implementation of the disclosure.
Figure 5B:
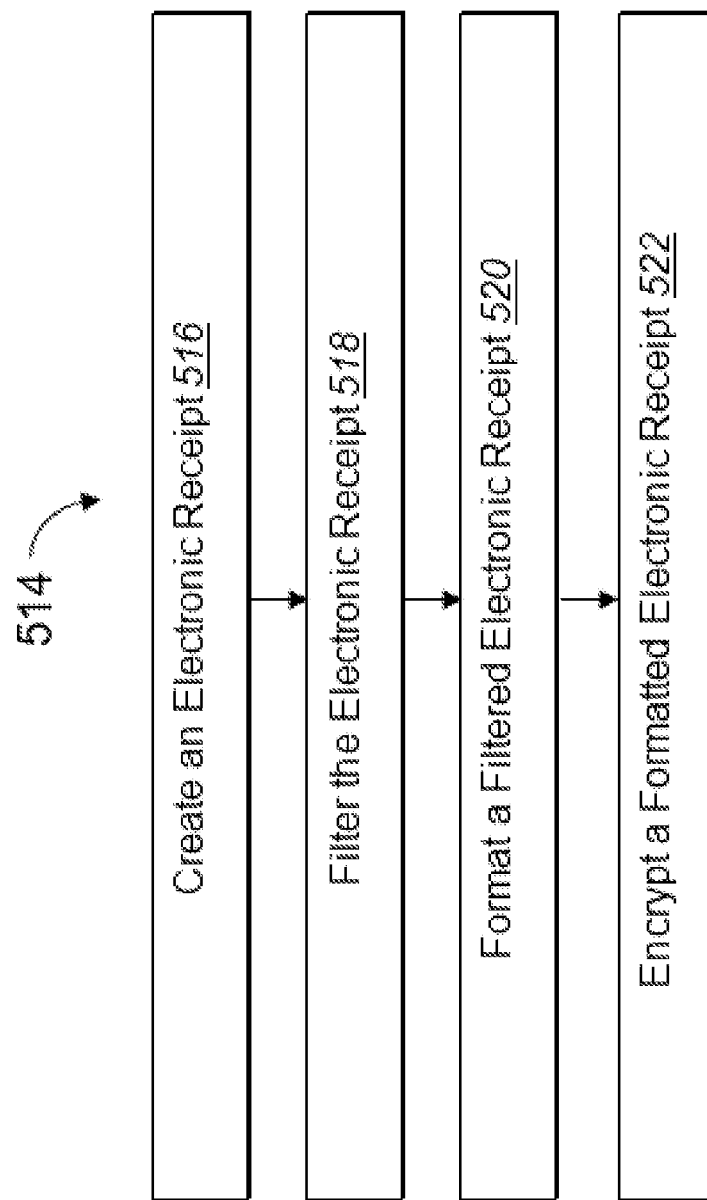
FIG. 5B is a flow diagram illustrating a method for receiving and transmitting an electronic receipt, according to an implementation of the disclosure.

Referring again to FIG. 1, suppose that a user employing the user device 108 is purchasing items and/or goods at a merchant's POS system (104). Before a purchase is made, the user may wish to obtain an invoice. After the purchase is made, the user may obtain an electronic receipt. FIGS. 5A and 5B below provide details regarding how the electronic receipt is generated and provided to the user.

FIG. 5A is a flow diagram illustrating a method 500 for receiving and transmitting an electronic receipt, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by any of the Point of Sale (POS) systems described in this application. For example, POS system 104, POS system 204, POS system 300, POS system 604, POS system 624, POS system 704, and/or POS system 724, depicted in FIGS. 1, 2, 3, 6A, 6B, 7A, and 7B, respectively, can perform the steps of method 500. Furthermore, any of electronic receipt generators, POS systems, user devices and application servers may be in communication with a respective POS system.

Referring to FIG. 5A, method 500 begins at block 502 when the POS system creates an itemized list of charges. As described above, the POS system may receive the charges from any of one or more employee input devices 318, one or more user input devices 322, or a network 330. In one implementation, a POS system may store the charges in a local memory 312 to create an itemized list of charges.

At block 504, the POS system tabulates a total amount due. As described above, the POS system may use a processor 304 to sum the itemized list of charges stored in a local memory 312. The POS system may also use a processor 304 to apply taxes, fees, discounts, and/or other adjustments to the sum of the itemized list of charges.

At block 506, the POS system transmits a payment. As described above, the POS system may notify a user of the total amount due using any one of one or more user output devices 324, employee output devices 320, and/or an electronic receipt generator 328. The user may render payment using any combination of payment methods accepted by the merchant.

In one implementation, the POS system transmits a request containing user payment credentials to a payment processor 332 over a network 330. The payment processor 332 forwards the user payment credentials to a credit card network (not depicted). The credit card network clears the payment and requests payment authorization from an issuing bank (not depicted) as identified in the user payment credentials.

In another implementation, the POS system transmits a request containing user payment data to one or more application servers. For example, application server 112 and or application server 212, depicted in FIGS. 1 and 2, respectively, may receive user payment data. The application server may perform one or more steps as directed by stored instructions to process, store, retrieve, or update user payment data. The transmittal of user payment data may be separate from or concurrent with any other transmittal performed by the POS system.

At block 508, the POS system receives a status of the payment. In one implementation, an issuing bank (not depicted) approves, or declines, the payment and sends back the appropriate response as a status to the payment processor 332 over a network 330.

At block 510, the POS system displays the status of the payment as provided by the issuing bank (not depicted). In one implementation, the POS system displays the status of the payment on any one or more of one or more employee output devices 320 and/or one or more user output devices 324. In one implementation, the POS system unlocks and opens a cash register 326 in response to a status of the payment directing a cash transfer to or from the user.

At block 512, the POS system outputs a compiled invoice. In an implementation, the POS system creates an invoice. The invoice may include such details as the business may direct, such as any one or more of data identifying the user, the employee, the location, the time of the transaction, the status of the payment as received in block 508, and/or the total amount due as tabulated in block 504. In an implementation, the electronic receipt generator includes a receiving unit configured to receive an invoice comprising receipt information from the POS system.

Some POS systems may be configured with a physical receipt printer (not depicted). The physical receipt printer may receive the compiled invoice from block 512 encoded using a printer data language such as Epson Standard Code for POS systems (ESC/POS). Then, the physical receipt printer may print a physical receipt containing the compiled invoice from block 512 for manual delivery to a user. However, in an implementation of the present disclosure, the POS system is configured with an electronic receipt generator to receive the compiled invoice from block 512. In another implementation, the electronic receipt generator includes a printing unit configured to print a physical copy of the receipt.

FIG. 5B is a flow diagram illustrating a method 514 for receiving and transmitting an electronic receipt, according to an implementation of the disclosure. The method 514 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 514 may be performed by any of the electronic receipt generators described in this application. For example, electronic receipt generator 106, electronic receipt generator 206, electronic receipt generator 328, electronic receipt generator 606, electronic receipt generator 626, electronic receipt generator 706, and/or electronic receipt generator 726 depicted in FIGS. 1, 2, 3, 6A, 6B, 7A, and 7B, respectively, can perform the steps of method 514. Furthermore, any of POS systems, user devices and application servers may be in communication with a respective electronic receipt generator.

Referring to FIG. 5B, method 514 begins at block 516 when the electronic receipt generator creates an electronic receipt. As described above, the electronic receipt generator may receive an invoice from a general-purpose computer 302. In an implementation, the electronic receipt generator receives an invoice using a serial data transfer technology, such as Universal Serial Bus (USB), Wi-Fi, Ethernet, or Bluetooth. In another implementation, the electronic receipt generator operates as a set of machine instructions on the general-purpose computer 302.

At block 518, the electronic receipt generator filters the electronic receipt. As used herein, "filter" means to apply one or more algorithms to remove data from a package such as an electronic receipt. For example, the electronic receipt generator may apply or more algorithms to detect and remove any one or more of special characters, images, and/or formatting instructions from the electronic receipt. In an implementation, the electronic receipt generator includes a filter unit configured to filter out a portion of the receipt information from the invoice using a filter to generate a filtered electronic receipt. In an implementation, the electronic receipt generator transmits the resulting filtered electronic receipt to the general-purpose computer 302 and the general-purpose computer 302 stores the filtered electronic receipt in a local memory 312.

At block 520, the electronic receipt generator formats a filtered electronic receipt. As used herein, "format" means to apply one or more algorithms to add data to a package such as a filtered electronic receipt. For example, the electronic receipt generator may apply one or more algorithms to add any one or more of special characters, images, and/or formatting instructions to the filtered electronic receipt. In an implementation, the electronic receipt generator includes a formatting unit configured to request injectable information from an application server and inject the injectable information into the filtered electronic receipt to generate a formatted electronic receipt. Injectable information may be any data, including custom promotional information tailored to a user device and/or a set of instructions to format an electronic receipt. In an implementation, the electronic receipt generator transmits the resulting formatted electronic receipt to the general-purpose computer 302 and the general-purpose computer 302 stores the formatted electronic receipt in a local memory 312.

At block 522, the electronic receipt generator encrypts a formatted electronic receipt. As used herein, "encrypt" means to apply one or more algorithms to cryptographically encode a package such as a formatted electronic receipt. For example, the electronic receipt generator may apply one or more algorithms such as a version of the Secure Hash Algorithm (SHA) combined with a cryptographic key to encrypt a formatted electronic receipt. In an implementation, the electronic receipt generator includes an encrypting unit configured to encrypt the formatted electronic receipt to generate an encrypted formatted electronic receipt.

In an implementation, the electronic receipt generator transmits the resulting encrypted formatted electronic receipt to the general-purpose computer 302 and the general-purpose computer 302 stores the encrypted formatted electronic receipt in a local memory 312. In another implementation, the electronic receipt generator includes a printing unit configured to print a physical copy of the formatted electronic receipt.

As described below, the electronic receipt generator may transmit an encrypted formatted electronic receipt to one or more applications using one or more communication flows. In an implementation, the electronic receipt generator includes a transmitting unit configured to transmit the encrypted formatted electronic receipt to the application server and/or to the Point of Sale system. In an implementation, the electronic receipt generator includes a data transfer unit configured to transmit the encrypted formatted electronic receipt to a user device in response to a request from the user device. The data transfer unit may be configured to transmit data using a contactless data transfer technology, such as Near Field Communication (NFC).

Figure 6A:
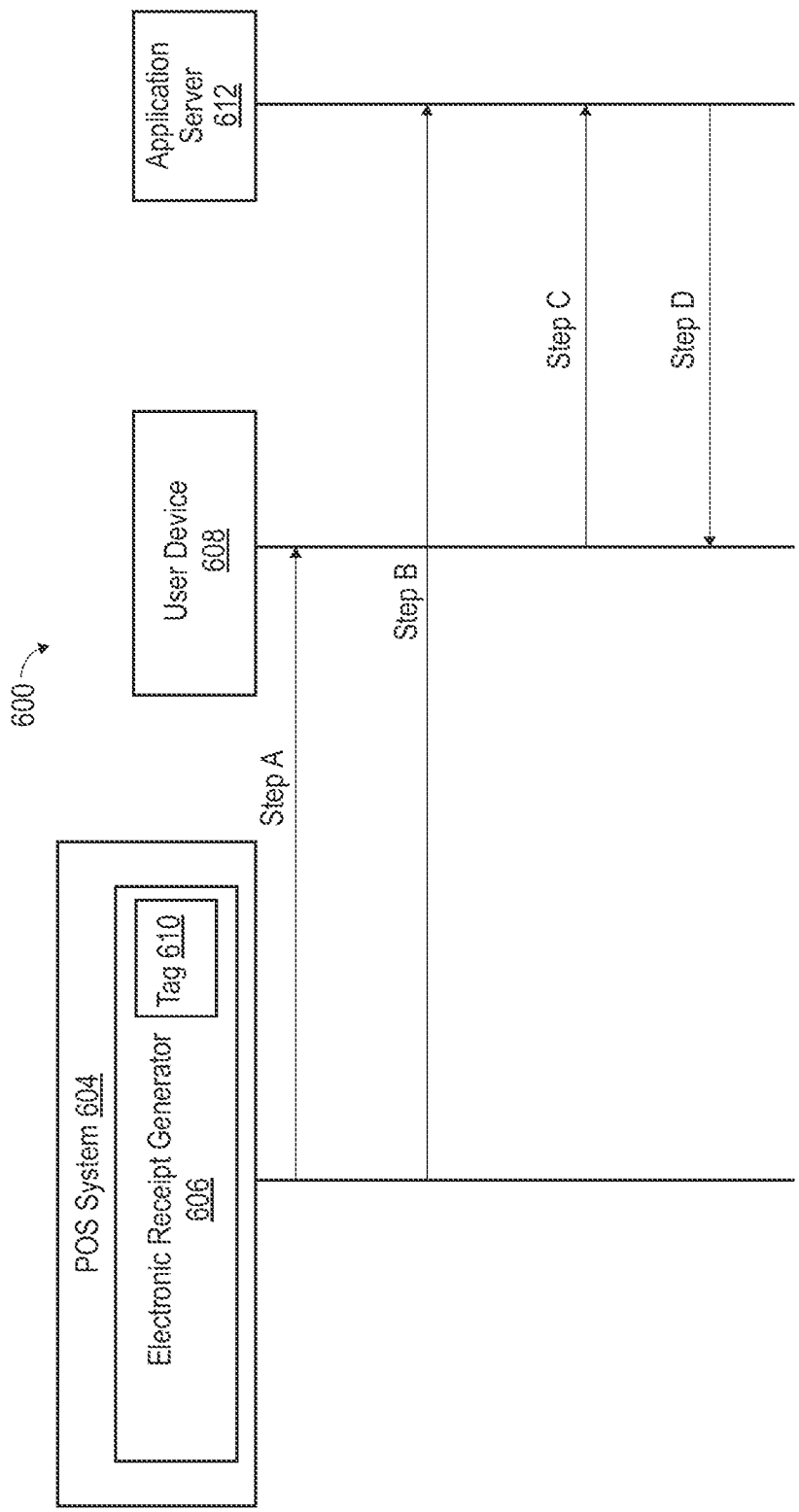
FIG. 6A is a flow diagram illustrating a communication flow between a POS system, including an electronic receipt generator, the user device, and the application server, according to an implementation of the disclosure.

FIG. 6A is a flow diagram illustrating a communication flow 600 between a POS system 604, including an electronic receipt generator 606, the user device 608, and the application server 612, according to an implementation of the disclosure. Although the electronic receipt generator 606 is depicted as being internal to POS system 604, in other implementations, the electronic receipt generator 606 may be external to and the POS system 604 and may communicate with the POS system 604 via a network (not depicted) such as described in FIGS. 1, 2 and 3. Although one user device 608 is depicted in FIG. 6A for simplicity and brevity, additional user devices may be interacting with application server 612 and/or POS system 604 as well. In the depicted embodiment, the user device 608 is a mobile device for simplicity and brevity. However, the user device 608 may be another type of device. The user device 608 may communicate with the application server 612 and/or the POS system 604 via a network (shown in FIG. 1). The user device 608 may be located in proximity to the electronic receipt generator 606. As used herein, "in proximity" means within the minimum physical range for wireless data transfer between the electronic receipt generator 606 and the user device 608.

Suppose that a user employing user device 608 has purchased an item(s), service(s) and/or good(s) and a receipt of the item(s), service(s) and/or good(s) is generated. In this implementation, the user has already submitted payment. After payment is made, the POS system 604 may confirm receipt of the payment and generate a receipt as follows.

First, the POS system 604 transmits a print request command to the electronic receipt generator 606 to generate an electronic receipt similar to the method described above. For example, the POS system 604 may transmit the request to print the electronic receipt in a clear text print protocol.

The electronic receipt generator 606 creates the electronic receipt based on the parameters provided by the POS system 604, such as the items bought by the user, date of purchase, total charges, applicable sales taxes, and identifying information for the store. The electronic receipt generator 606 may then filter out any rich text and/or media including graphical data that includes images such as a merchant's image and/or logo, a quick response (QR) code, etc., from the electronic receipt. For example, the rich text and/or graphical data may be filtered out and removed from the print payload of a digital receipt packet to generate a filtered electronic receipt.

The electronic receipt generator 606 then formats the filtered electronic receipt. As used herein, "format" means to apply one or more algorithms to add data to a package such as a filtered electronic receipt. For example, the electronic receipt generator may apply one or more algorithms to add any one or more of special characters, images, and/or formatting instructions to the filtered electronic receipt.

The electronic receipt generator 606 then encrypts the filtered electronic receipt and writes it onto an embedded tag 610. For example, the electronic receipt generator may apply one or more algorithms such as a version of the Secure Hash Algorithm (SHA) combined with a public or private cryptographic key derived from a Public Key Infrastructure (PKI) system to encrypt a filtered electronic receipt. The encrypted filtered electronic receipt is made available for further transfer by the embedded tag 610. The embedded tag 610 may be internal or external to the electronic receipt generator 606.

In an implementation, the filtered electronic receipt contains a merchant ID, a print payload, a unique e-receipt ID, and an electronic receipt generator ID. Prior to encryption, the filtered electronic receipt may contain all of some of the above-mentioned information. The electronic receipt generator 606 may encrypt all of some of this information. In one example, the electronic receipt generator 606 may encrypt the print payload and merchant ID.

Referring again to FIG. 6A, the embedded tag 610 which may be internal or external to the electronic receipt generator 606 of the POS system 604 holds the encrypted filtered electronic receipt. At step A, when the user device 608 is held in proximity to the embedded tag 610 and the user device 608 interacts with the embedded tag 610 (e.g., the user taps or touches the user device 608 to the electronic receipt generator 606), the user device 608 receives the encrypted filtered electronic receipt via an NFC read action on the user device 608. An NFC read action occurs when the user device 608 reads the embedded tag 610 and the encrypted filtered electronic receipt is transferred to the user device 608. The encrypted filtered electronic receipt includes a merchant ID, a print payload, a unique electronic receipt ID, and/or a unique ID associated with the electronic receipt generator 606 (such as a media access control (MAC) address associated with the electronic receipt generator). The unique ID may be unique to the electronic receipt generator 606.

At step B, the electronic receipt generator 606 transmits the encrypted filtered electronic receipt to the application server 612. In an implementation, the electronic receipt generator 606 communicates with the application server 612 using the Message Queuing Telemetry Transport (MQTT) protocol. The application server 612 stores the encrypted filtered electronic receipt on a storage device. For example, the encrypted filtered electronic receipt may be stored in a database on a storage device.

The application server 612 decrypts the print payload of the encrypted filtered electronic receipt to generate a decrypted electronic receipt. The application server 612 then formats the decrypted electronic receipt and stores it on the storage device. The formatting may include placing rich text and/or media including graphical data that includes images such as an image and/or logo associated with the merchant ID contained in the electronic receipt back onto the decrypted electronic receipt to generate a rich electronic receipt.

In an implementation, the electronic receipt transmitted by the electronic receipt generator 606 and received by the user device 608 and the electronic receipt transmitted by the electronic receipt generator 606 and received by the application server 612 is the same.

At step C, the user device 608 transmits the encrypted filtered electronic receipt to the application server 612. Specifically, a user application (not depicted) running on the user device 608 transmits the encrypted filtered electronic receipt to the application server 612. As described above with respect to step A, the encrypted filtered electronic receipt includes a merchant ID, a print payload, and/or a unique ID associated with the electronic receipt generator 606 (such as a media access control (MAC) address associated with the electronic receipt generator). The unique ID may be unique to the electronic receipt generator 606.

Upon receipt of the encrypted filtered electronic receipt, the application server 612 compares the encrypted filtered electronic receipt to one or more others stored in the storage device. The application server 612 may use any method of sorting and comparing of databases to determine that the particular encrypted filtered electronic receipt matches the one received in step B. The comparison is also referred to as a check. In an implementation, the application server 612 compares the unique electronic receipt ID with the existing electronic receipt ID values stored in a data store (not depicted). If a match is found, the application server 612 returns the accompanying decrypted formatted electronic receipt back to the user device 608. If a match is not found, the application server 612 decrypts the encrypted filtered electronic receipt, formats the filtered electronic receipt, stores the formatted electronic receipt in a data store, and returns the formatted electronic receipt to the user device 608.

In an implementation, the electronic receipt generator 606 is configured to operate in an offline mode when required. In the offline mode configuration, the user device 608 receives the encrypted filtered electronic receipt from the electronic receipt generator 606. The user device then submits a copy of the encrypted filtered electronic receipt with its request to the application server 612. As described above, the application server 612 then decrypts the encrypted filtered electronic receipt, formats the filtered electronic receipt, stores the formatted electronic receipt in a data store, and returns the formatted electronic receipt to the user device 608.

At step D, the application server 612 transmits the rich electronic receipt described in step B to the user device 608. Specifically, the application server 612 transmits the rich electronic receipt to a user application (not depicted) running on the user device 608.

A user employing user device 608 may then view the rich electronic receipt via a user application running on the user device 608. The rich electronic receipt may be presented as rich media on a display device of the user device 608.

The user may interact with the rich electronic receipt to obtain rewards, access surveys, provide reviews, and/or transmit the receipt to friends in order to split costs.

Figure 6B:
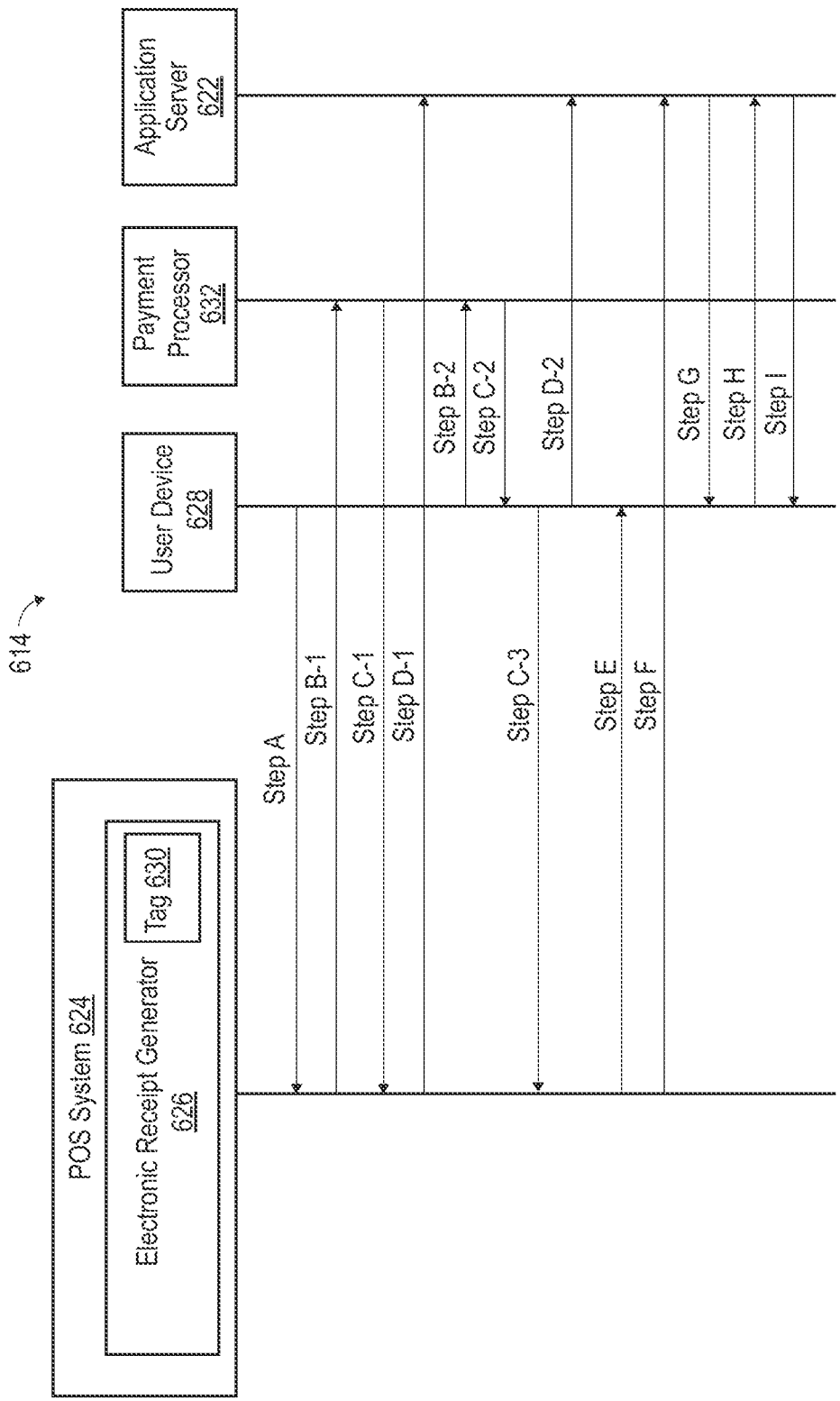
FIG. 6B is a flow diagram illustrating another communication flow between a POS system, including an electronic receipt generator, the user device, a payment processor, and the application server, according to an implementation of the disclosure.

In FIG. 6A, a user making a purchase may submit payment using a variety of methods and the related steps occur after payment is posted. In FIG. 6B, some steps occur prior to payment and integration of a payment processor is described.

FIG. 6B is a flow diagram illustrating another communication flow 614 between a POS system 624, including an electronic receipt generator 626, the user device 628, a payment processor 632, and the application server 622, according to an implementation of the disclosure. Although the electronic receipt generator 626 is depicted as being internal to the POS system 624, in other implementations, the electronic receipt generator 626 may be external to and the POS system 624 and may communicate with the POS system 624 via a network (not depicted) such as described in FIGS. 1, 2 and 3. Although one user device 628 is depicted in FIG. 6B for simplicity and brevity, additional user devices may be interacting with application server 622, payment processor 632, and/or POS system 624 as well. In the depicted embodiment, the user device 628 is a mobile device for simplicity and brevity. However, the user device 628 may be another type of device. The user device 628 may communicate with the application server 622, the payment processor 632, and/or the POS system 624 via a network (not depicted). The user device 628 may be located in proximity to the electronic receipt generator 626. As used herein, "in proximity" means within the minimum physical range for wireless data transfer between the electronic receipt generator 606 and the user device 608.

Suppose that a user employing user device 628 wishes to purchase an item(s), service(s) and/or good(s) and an invoice (or bill) containing the item(s), service(s) and/or good(s) is to be generated. For example, an employee of a retail store may scan items for purchase by the user into the POS system 624. The POS system 624 may transmit a list of order details, such as item(s), service(s), and/or good(s), to the to the electronic receipt generator 626 to generate the invoice. The list of items may be transmitted to the electronic receipt generator 626 in the form of one or more data packets. A packet may contain a merchant ID, a unique electronic receipt ID, geographic coordinates, time data, and order details.

The electronic receipt generator 626 generates the invoice.

The user may view a graphical and/or textual representation of the total amount due provided on the invoice on a display device of the POS system 624. In other implementations, the invoice may be viewable by the user on a display device of user device 628 after the user device 628 receives the invoice (as described herein with respect to step B-1). At step A, if the user is submitting payment via non-paper/plastic payment (e.g., credit card or debit card) or electronic payment, the user device 628 transmits a user ID unique to the app running on the user device 628 along with a payment method to the electronic receipt generator 626. The user device 628 may transmit the user ID and payment method via the embedded tag 630. The transmittal of payment and user details from the user device 628 to the electronic receipt generator 626 can be performed using NFC write functionality or NFC peer to peer functionality.

Step B-1 may be an optional step and can be performed as an alternative to step B-2, and vice versa. Suppose that a user purchasing the items listed on the invoice wishes to initiate payment. The user may provide non-paper/plastic payment (e.g., credit card or debit card) or electronic payment at a payment terminal local or remote (i.e., at the payment processor 632) to the POS system 624 as detailed in step B-1. Alternatively, the user may submit paper money as payment at cash register at the POS system 624. As another alternative, the user may submit payment to a payment processor via the user device 628 as detailed in step B-2. If the user device 628 is making the payment directly to the payment processor 632 then the invoice details such as total amount may be sent to the user device 628. In an implementation, the electronic receipt generator 626 transmits invoice details to the user device 628 using an NFC read/write method and/or an NFC peer to peer connection.

Suppose that the user wishes to submit paper money as payment. Upon receipt of physical paper money payment, the POS system 624 and/or at the electronic receipt generator 626 updates the list and/or invoice, respectively, to mark it as paid. Since no interaction with a payment processor 632 is required, step D-1 (described herein below) follows after payment is made with paper money or any physical currency.

Suppose instead that the user wishes to submit payment at a payment terminal in communication with the POS system 624. At step B-1, the POS system 624, in response to receipt of a non-paper/plastic payment (e.g., credit card or debit card) or electronic payment at the POS system 604 (and/or at the electronic receipt generator 626), the POS system 624 and/or the electronic receipt generator 626, transmits payment to the payment processor 632.

The payment transmission may be performed using a variety of methods. For example, the user may place, tap, or otherwise provide a plastic payment and at a card terminal at the POS system 624. Otherwise, the credentials of the plastic payment may be transmitted to a remote terminal which is linked to the payment processor 632. Alternatively, the user may tap or otherwise initiate payment using a mobile wallet application by placing the user device 628 in the vicinity of the card terminal to initiate payment that is transmitted to the payment processor 632.

At step C-1, the payment processor 632 confirms receipt of the payment and transmits the confirmation to the POS system 624. Upon receipt of the confirmation at the POS system 624 (and/or at the electronic receipt generator 626), the POS system 624 and/or at the electronic receipt generator 626 updates the list and/or invoice, respectively, to mark it as paid.

At step D-1, the electronic receipt generator 626 transmits the confirmation to the application server 622. The confirmation may be accompanied by a set of additional data. In an implementation, the confirmation is accompanied by a copy of the list and/or invoice. In yet another implementation, the confirmation is accompanied by unique identifying information for the electronic receipt generator 626 and/or unique identifying information for the user device 628. Thereafter, step E (described herein below) follows.

In yet another implementation, the user may submit payment without having to first interact with the POS system 624. For example, the user may access a bank account, a third-party vendor account or other account associated with or otherwise in communication with the payment processor 632 on an app. on the user device 628 to process payment. Suppose that the user's invoice is for $10.00. The user may access the app. in order to connect to the payment processor 632 and transfer $10.00 into an account associated with the merchant associated with the POS system 624. Referring again to FIG. 6B, at step B-2, a user employing user device 628 would complete payment for the invoice by transmitting payment to the payment processor 632.

At step C-2, the payment processor 632 confirms receipt of the payment and transmits the confirmation to the user device 628.

At step C-3, the user device 628 transmits the confirmation to POS system 624 (and/or at the electronic receipt generator 626). Upon receipt of the confirmation at the POS system 624 (and/or at the electronic receipt generator 626), the POS system 624 and/or at the electronic receipt generator 626 updates the list and/or invoice, respectively, to mark it as paid.

At step D-2, the user device transmits a copy of the confirmation of payment to the application server 622. The confirmation of payment may be accompanied by a set of additional data. In an implementation, the confirmation of payment is accompanied by a copy of the invoice. In yet another implementation, the confirmation of payment is accompanied by unique identifying information for the electronic receipt generator 626 and/or unique identifying information for the user device 628. Thereafter, step E (described herein below) follows.

Following either step D-1 or step D-2, the POS system 624 transmits a print request command to the electronic receipt generator 626 to generate an electronic receipt similar to the method described above. For example, the POS system 624 may transmit the request to print the electronic receipt in a clear text print protocol.

The electronic receipt generator 626 creates the electronic receipt based on the parameters requested by the POS system 624. The electronic receipt generator 626 may then filter out any rich text and/or media including graphical data that includes images such as a merchant's image and/or logo, a quick response (QR) code, etc., from the electronic receipt. For example, the rich text and/or graphical data may be filtered out and removed from the print payload of a digital receipt packet to generate a filtered electronic receipt.

The electronic receipt generator 626 then encrypts the filtered electronic receipt writes it onto an embedded tag 630. The encrypted filtered electronic receipt is made available for further transfer by the embedded tag 630. The embedded tag 630 may be internal or external to the electronic receipt generator 626.

In an implementation, the filtered electronic receipt contains a merchant ID, a print payload, a unique e-receipt ID, and an electronic receipt generator ID. Prior to encryption, the filtered electronic receipt may contain all or some of the above-mentioned information. The electronic receipt generator 626 may encrypt all of some of this information. In one example, the electronic receipt generator 626 may encrypt the print payload and merchant ID.

Referring again FIG. 6B, the embedded tag 630 which may be internal or external to the electronic receipt generator 626 of the POS system 624 holds the encrypted filtered electronic receipt. At step E, if the user device 628 is held in proximity to the embedded tag 630 and the user device 628 interacts with the embedded tag 630 (e.g., the user taps or touches user device 628 to the electronic receipt generator 626), the user device 628 receives the encrypted filtered electronic receipt via an NFC read action on the user device 628. An NFC read action occurs when the user device 628 reads the embedded tag 630 and the encrypted filtered electronic receipt is transferred to the user device 628. In another implementation, if the user device 628 is not held in proximity to the embedded tag 630 at step E, the user may still receive a formatted electronic receipt as described in step F below. The encrypted filtered electronic receipt includes a merchant ID, a print payload, and/or unique ID associated with the electronic receipt generator 626 (such as a media access control (MAC) address associated with the electronic receipt generator). The unique ID may be unique to the electronic receipt generator 626.

At step F, the electronic receipt generator 626 transmits the encrypted filtered electronic receipt to the application server 622. The application server 622 stores the encrypted filtered electronic receipt on a storage device. For example, the encrypted filtered electronic receipt may be stored in one or more databases on one or more storage devices.

The application server 622 decrypts the print payload of the encrypted filtered electronic receipt to generate a decrypted electronic receipt. The application server 622 then formats the decrypted electronic receipt and stores it on the storage device. The formatting may include placing rich text and/or media including graphical data that includes images such as an image and/or logo associated with the merchant ID contained in the electronic receipt back onto the decrypted electronic receipt to generate a rich electronic receipt.

In an implementation, the electronic receipt transmitted by the electronic receipt generator 626 and received by the user device 628 and the electronic receipt transmitted by the electronic receipt generator 626 and received by the application server 622 is the same.

At step G, the application server 622 transmits a receipt notification to the user device 628. Specifically, a user application (not depicted) running on the user device 628 receives the receipt notification from the application server 622 that the receipt is ready for transmission to the user device 628.

At step H, the user device 628 sends a receipt download request to the application server 622. Specifically, a user application (not depicted) running on the user device 628 sends a receipt download request to the application server 622.

At step I, the application server 622 transmits the rich electronic receipt described in F to the user device 628. Specifically, the application server 622 transmits the rich electronic receipt to a user application (not depicted) running on the user device 628.

A user employing user device 628 may then view the rich electronic receipt via a user application running on the user device 628. The rich electronic receipt may be presented as rich media on a display device of the user device 628.

The user may interact with the rich electronic receipt to obtain rewards, access surveys, provide reviews, and/or transmit the receipt to friends in order to split costs.

In another implementation (not depicted), after step F, the user device 628 instead transmit the encrypted filtered electronic receipt to the application server 622. Specifically, a user application (not depicted) running on the user device 628 transmits the encrypted filtered electronic receipt to the application server 622. As described above, the encrypted filtered electronic receipt includes a merchant ID, a print payload, and/or a unique ID associated with the electronic receipt generator 626 (such as a media access control (MAC) address associated with the electronic receipt generator). The unique ID may be unique to the electronic receipt generator 626.

Upon receipt of the encrypted filtered electronic receipt, the application server 622 compares the encrypted filtered electronic receipt to one or more others stored in the storage device. The application server 622 may use any method of sorting and comparing of databases to determine that the particular encrypted filtered electronic receipt matches the one received in step E. The comparison is also referred to as a check.

The POS system may be operated by an employee of the merchant or the POS system may not be operated by any person (e.g., a self-checkout kiosk). Self-checkout kiosks allow users to scan items at the POS system and submit payment without an employee present.

In FIGS. 6A and 6B, the user device is in proximity to the POS system and the electronic receipt generator. However, in certain situations, the user device may not be in proximity to the POS system. For example, a user employing the user device may be dining out at a restaurant or socially distancing from employees of a merchant who standing by the POS system. Therefore, the user may be located remotely from the POS system (i.e., not in the immediate vicinity or proximity of the POS system).

Figure 7A:
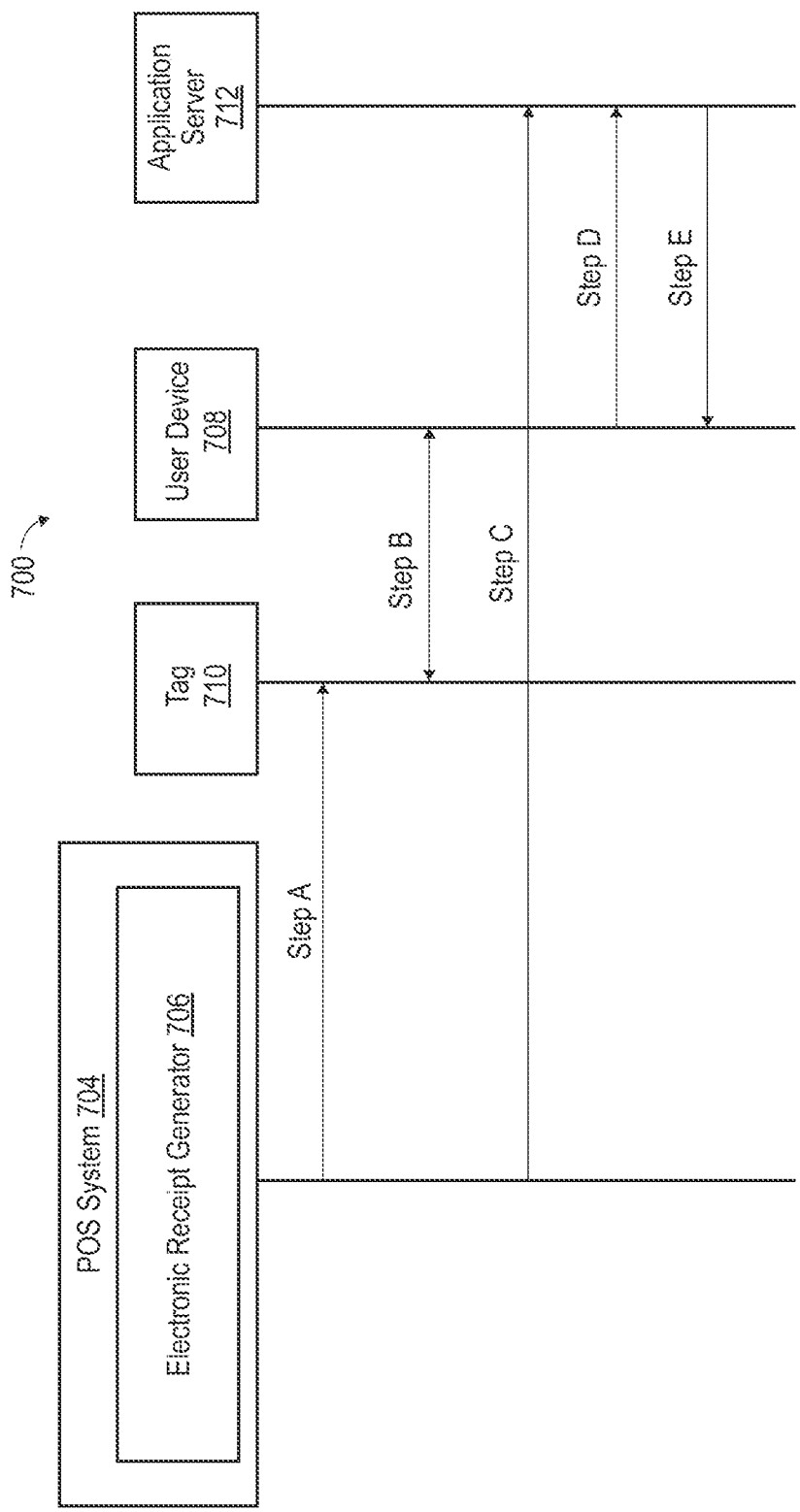
FIG. 7A is a flow diagram illustrating a communication flow between remote devices, according to an implementation of the disclosure.

FIG. 7A is a flow diagram illustrating a communication flow 700 between remote devices, according to an implementation of the disclosure. Specifically, the communication flow 700 includes a POS system 704, including an electronic receipt generator 706, may be located remote from the user device 708, and the application server 712. As used herein, "remote" means that the user device 708 is not in proximity of the electronic receipt generator 706 while a transaction is underway. For example, an electronic receipt generator 706 would be located remote from a food delivery made to a residence of a user employing the user device 708. A tag 710 may be an embedded NFC tag, a QR code, a Bluetooth device, or other type of tag. In an implementation, the tag 710 may be located on a physical medium such as a piece of paper, cardboard, plastic, wood, metal, glass, ceramic or other hard material, or combinations thereof. For example, the tag 710 may be included on a paper pamphlet that includes a merchant's name, logo, address, or other identifying information associated with the merchant.

In one example, suppose that a user employing the user device 708 is dining out at a merchant's restaurant. The tag 710 may be included on a paper pamphlet that can be transported between the POS system 704 and any user dining in the restaurant.

Suppose that a user employing user device 708 has purchased an item(s), service(s), and/or good(s), and a receipt of the item(s) and/or good(s) is generated. In this implementation, the user has already submitted payment. For example, a user employing the user device 708 may be sitting a table at a merchant's restaurant and may have submitted payment for his/her meal. The user may then await confirmation of his bill payment (i.e., a receipt) to be provided to him. The user may wish to obtain the receipt for his/her records and may wish to add a tip for the server that provided his/her meal. After payment is made, the POS system 704 may confirm receipt of the payment and generate a receipt as follows.

The POS system 704 transmits a print request command to the electronic receipt generator 706 to generate an electronic receipt similar to the method described above. For example, the POS system 704 may transmit the request to print the electronic receipt in a clear text print protocol.

The electronic receipt generator 706 creates the electronic receipt based on the parameters requested, such as a merchant ID, a unique electronic receipt ID, geographic coordinates, time data, and order details, by the POS system 704. The electronic receipt generator 706 may then filter out any rich text and/or media including graphical data that includes images such as a merchant's image and/or logo, a quick response (QR) code, etc., from the electronic receipt. For example, the rich text and/or graphical data may be filtered out and removed from the print payload of a digital receipt packet to generate a filtered electronic receipt.

The electronic receipt generator 706 then formats the filtered electronic receipt. As used herein, "format" means to apply one or more algorithms to add data to a package such as a filtered electronic receipt. For example, the electronic receipt generator may apply one or more algorithms to add any one or more of special characters, images, and/or formatting instructions to the filtered electronic receipt.

In an implementation, the filtered electronic receipt contains a merchant ID, a print payload, a unique e-receipt ID, and an electronic receipt generator ID. Prior to encryption, the filtered electronic receipt may contain all of some of the above-mentioned information. The electronic receipt generator 706 may encrypt all of some of this information. In one example, the electronic receipt generator 706 may encrypt the print payload and merchant ID.

At step A, the electronic receipt generator 706 encrypts the filtered electronic receipt and writes it onto an embedded tag 710. For example, the electronic receipt generator may apply one or more algorithms such as a version of the Secure Hash Algorithm (SHA) combined with a public or private cryptographic key derived from a Public Key Infrastructure (PKI) system to encrypt a filtered electronic receipt. For example, a pamphlet with an embedded tag 710 may be placed in proximity to the electronic receipt generator 706 for the electronic receipt generator 706 to write onto the embedded tag 710.

The encrypted filtered electronic receipt is made available for further transfer by the embedded tag 710. As described above, the embedded tag 710 containing the encrypted filtered electronic receipt may be located on a pamphlet that is carried over to a user employing the user device 708. Otherwise, the embedded tag 710 may be located within an object (such as a statue, a paper weight, a painting, a candle holder, etc.) that is located in proximity to the user device 708 or the user can transport the user device 708 so that it's in the proximity to the tag 710.

Thus, at step B, when the user device 708 is held in proximity to the embedded tag 710 and the user device 708 interacts with the embedded tag 710 (e.g., the user taps or touches the embedded tag 710), the user device 708 receives the encrypted filtered electronic receipt via an NFC read action on the user device 708. An NFC read action occurs when the user device 708 reads the embedded tag 710 and the encrypted filtered electronic receipt is transferred to the user device 708. The encrypted filtered electronic receipt includes a merchant ID, a print payload, and/or unique ID associated with the electronic receipt generator 706 (such as a media access control (MAC) address associated with the electronic receipt generator). The unique ID may be unique to the electronic receipt generator 706.

At step C, the electronic receipt generator 706 transmits the encrypted filtered electronic receipt to the application server 712. In an implementation, the electronic receipt generator 706 communicates with the application server 712 using the Message Queuing Telemetry Transport (MQTT) protocol. The application server 712 stores the encrypted filtered electronic receipt on a storage device. For example, the encrypted filtered electronic receipt may be stored in one or more databases on one or more storage devices.

The application server 712 decrypts the print payload of the encrypted filtered electronic receipt to generate a decrypted electronic receipt. The application server 712 then formats the decrypted electronic receipt and stores it on the storage device. The formatting may include placing rich text and/or media including graphical data that includes images such as an image and/or logo associated with the merchant ID contained in the electronic receipt back onto the decrypted electronic receipt to generate a rich electronic receipt.

In an implementation, the electronic receipt transmitted by the electronic receipt generator 706 and received by the user device 708 and the electronic receipt transmitted by the electronic receipt generator 706 and received by the application server 712 is the same.

At step D, the user device 708 transmits the encrypted filtered electronic receipt to the application server 712. Specifically, a user application (not depicted) running on the user device 708 transmits the encrypted filtered electronic receipt to the application server 712. As described above, the encrypted filtered electronic receipt includes a merchant ID, a print payload, and/or a unique ID associated with the electronic receipt generator 706 (such as a media access control (MAC) address associated with the electronic receipt generator). The unique ID may be unique to the electronic receipt generator 706.

Upon receipt of the encrypted filtered electronic receipt, the application server 712 compares the encrypted filtered electronic receipt to one or more others stored in the storage device. The application server 712 may use any method of sorting and comparing of databases to determine that the particular encrypted filtered electronic receipt matches the one received in step C. The comparison is also referred to as a check.

In an implementation, the electronic receipt generator 706 is configured to operate in an offline mode when required. In the offline mode configuration, the user device 708 receives the encrypted filtered electronic receipt from the electronic receipt generator 706. The user device then submits a copy of the encrypted filtered electronic receipt with its request to the application server 712. As described above, the application server 712 then decrypts the encrypted filtered electronic receipt, formats the filtered electronic receipt, stores the formatted electronic receipt in a data store, and returns the formatted electronic receipt to the user device 708.

At step E, the application server 712 transmits the rich electronic receipt described in step C to the user device 708. Specifically, the application server 712 transmits the rich electronic receipt to a user application (not depicted) running on the user device 708.

A user employing user device 708 may then view the rich electronic receipt via a user application (not depicted) running on the user device 708. The rich electronic receipt may be presented as rich media on a display device of the user device 708.

The user may interact with the rich electronic receipt to obtain rewards, access surveys, provide reviews, and/or transmit the receipt to friends in order to split costs. The user may further provide a tip for a server and submit the payment from the user device 708 a payment processor (not depicted).

Figure 7B:
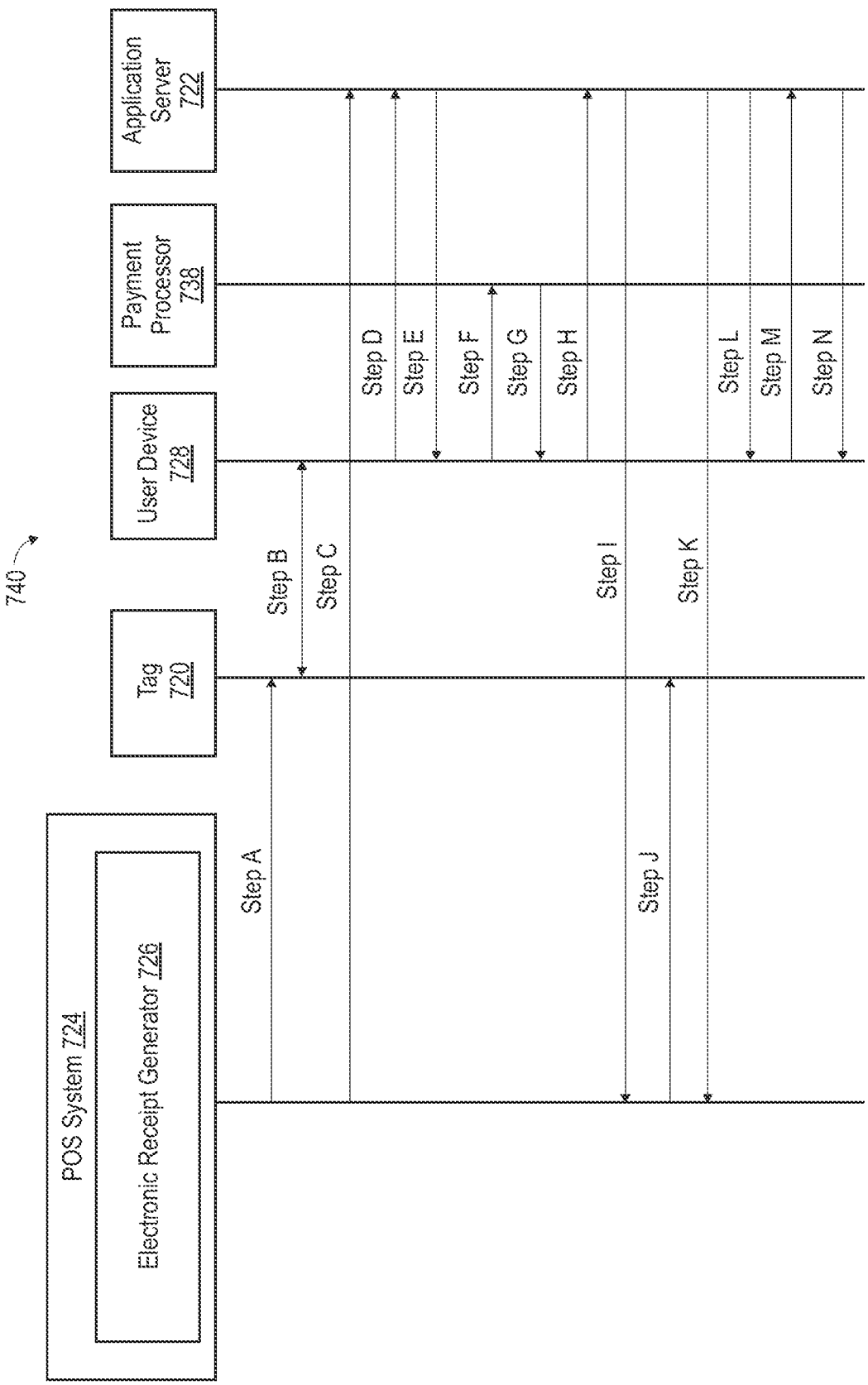
FIG. 7B is a flow diagram illustrating another communication flow between remote devices, according to an implementation of the disclosure.

In FIG. 7A, a user making a purchase may submit payment using a variety of methods and the related steps occur after payment is posted. In FIG. 7B, some steps occur prior to payment and integration of a payment processor is described.

FIG. 7B is a flow diagram illustrating another communication flow 740 between remote devices, according to an implementation of the disclosure. Specifically, the communication flow 740 includes a POS system 724, including an electronic receipt generator 726, may be located remote from the user device 728, a payment processor 738, and the application server 722. As used herein, "remote" means that the user device 708 is not in proximity of the electronic receipt generator 706 while a transaction is underway. A tag 720 may be an embedded NFC tag, a QR code, a Bluetooth device, or other type of tag. In an implementation, the tag 720 may be located on a physical medium such as a piece of paper, cardboard, plastic, wood, metal, glass, ceramic or other hard material, or combinations thereof. For example, the tag 720 may be included on a paper pamphlet that includes a merchant's name, logo, address, or other identifying information associated with the merchant.

In one example, suppose that a user employing the user device 728 is receiving either food at a merchant's restaurant or food delivery at the user's residence. The tag 720 may be included on a paper pamphlet that can be transported between the POS system 724 and any user dining in the restaurant or at the user's residence.

Suppose that a user employing user device 728 has purchased an item(s), service(s), and/or good(s), and a receipt of the item(s) and/or good(s) is generated.

For example, a user employing the user device 728 may be sitting a table at a merchant's restaurant or standing at the door of the user's residence and request an invoice (i.e., a check) for his/her meal so that payment can be submitted. A server, delivery person, or other employee of the merchant may generate an invoice by entering the items purchased into the POS system 724. The POS system 724 may transmit a list of item(s) (such as food items), service(s), and/or good(s) to the to the electronic receipt generator 726 to generate the invoice. The list of items may be transmitted to the electronic receipt generator 726 in the form of one or more data packets. A packet may contain a merchant ID, a unique electronic receipt ID, geographic coordinates, time data, and order details.

The electronic receipt generator 726 generates the invoice.

The user may view a graphical and/or textual representation of the total amount due provided on the invoice on a display device of the POS system 724, a display device located close to his/her dining table, a display device brought to the user's residence, a paper or electronic bill that is provided to (i.e., brought over by a server, delivery person, or other employee of the merchant) the user, and eventually, the invoice may be viewable by the user on a display device of user device 728 after the user device 728 receives the invoice (as described herein below).

At step A, the electronic receipt generator 726 encrypts the invoice and writes it onto an embedded tag 720. As used herein, "encrypt" means to apply one or more algorithms to cryptographically encode a package such as a formatted electronic receipt. For example, the electronic receipt generator may apply one or more algorithms such as a version of the Secure Hash Algorithm (SHA) combined with a cryptographic key to encrypt a formatted electronic receipt. In an implementation, the electronic receipt generator transmits the resulting encrypted formatted electronic receipt to the embedded tag 720 using an NFC "write" technology.

A medium (e.g., pamphlet) containing the embedded tag 720 is carried over to the user or the user otherwise comes in proximity to the embedded tag 720.

The invoice is made available for further transfer by the embedded tag 720. As described above, the embedded tag 720 containing the invoice may be located on a pamphlet that is carried over to a user employing the user device 728. Otherwise, the embedded tag 720 may be located within an object (such as a statue, a paper weight, a painting, a candle holder, etc.) that is located in proximity to the user device 728 or the user can transport the user device 728 so that it's in the proximity to the tag 720.

Thus, at step B, when the user device 728 is held in proximity to the embedded tag 720 and the user device 728 interacts with the embedded tag 720 (e.g., the user taps or touches the embedded tag 720), the user device 728 receives the invoice via an NFC read action on the user device 728. An NFC read action occurs when the user device 728 reads the embedded tag 720 and the invoice is transferred to the user device 728. The invoice includes a merchant ID, a print payload, and/or unique ID associated with the electronic receipt generator 726 (such as a media access control (MAC) address associated with the electronic receipt generator). The unique ID may be unique to the electronic receipt generator 726.

In an implementation, prior to transmitting the invoice in step A, the electronic receipt generator 726 may filter out any rich text and/or media including graphical data that includes images such as a merchant's image and/or logo, a quick response (QR) code, etc. Therefore, the invoice received by the user device 728 in step B may be a filtered invoice. Additionally, the invoice may further be encrypted in a manner similar to the one described above before transmission to the application server 722.

At step C, the electronic receipt generator 726 transmits the encrypted filtered invoice to the application server 722. The application server 722 stores the encrypted filtered invoice on a storage device. For example, the encrypted filtered invoice may be stored in one or more databases on one or more storage devices.

The application server 722 decrypts the print payload of the encrypted filtered invoice to generate a decrypted invoice. The application server 722 then formats the decrypted receipt and stores it on the storage device. The formatting may include placing rich text and/or media including graphical data that includes images such as an image and/or logo associated with the merchant ID contained in the invoice back onto the decrypted invoice to generate a rich invoice.

In an implementation, the application server 722 may transmit the invoice to the user device 728 if the user device 728 requests the invoice. For example, the user employing user device 728 may request the invoice as a backup (in case the invoice obtained from the embedded tag 720 is lost, corrupted, etc.).

At step D, the user device 728 transmits the invoice read from the embedded tag 720 to the application server 722. The invoice includes a print payload, and/or a unique ID associated with the electronic receipt generator 726 (such as a media access control (MAC) address associated with the electronic receipt generator). The unique ID may be unique to the electronic receipt generator 726.

The application server 722 that formatted the invoice that was received from step C retrieves the rich invoice from a storage device.

At step E, the application server 722 transmits the rich invoice to the user device 728.

At step F, the user employing user device 728 sends payment to the payment processor 732 to pay the invoice. The user device 728 may add a tip onto the payment.

The payment processor 732 recognizes that the payment received is associated with the merchant and/or the invoice. For example, a payment processor 732 may associate a unique merchant ID with each merchant.

In other implementations, the user may submit cash or another form of payment locally within the merchant's restaurant. In such implementations, after payment is recorded at the POS system 724, the electronic receipt generator 726 generates an invoice as described below and step J follows.

At step G, the payment processor 732 transmits a message to the user device 728 indicating that the payment was successful. If a payment failed, the payment processor 732 would send a failed payment message to the user device 728 and a new form of payment can be initiated by the user.

At step H, the user device 728 transmits a payment successful message to the application server 722.

At step I, the application server 722 sends a payment successful message to the POS system 724 and/or to the electronic receipt generator 726.

The user may then await confirmation of his bill payment (i.e., a receipt) to be provided to him. In an implementation, a group of customers using a user application may split a payment prior to or after processing a payment and receiving an electronic receipt. In an implementation, multiple types of bill splitting may be supported, including an equal share, multiple-based share, user-selected proportional share, item-based splitting, and/or a combination of the above. The user may wish to obtain the receipt for his/her records and may wish to add a tip for the server that provided his/her meal. After payment is made, the POS system 724 may confirm receipt of the payment and generate a receipt as follows.

The POS system 724 transmits a print request command to the electronic receipt generator 726 to generate an electronic receipt similar to the method described above. For example, the POS system 724 may transmit the request to print the electronic receipt in a clear text print protocol.

The electronic receipt generator 726 creates the electronic receipt based on the parameters requested, such as a merchant ID, a unique electronic receipt ID, geographic coordinates, time data, and order details, by the POS system 724. The electronic receipt generator 726 may then filter out any rich text and/or media including graphical data that includes images such as a merchant's image and/or logo, a quick response (QR) code, etc., from the electronic receipt. For example, the rich text and/or graphical data may be filtered out and removed from the print payload of a digital receipt packet to generate a filtered electronic receipt.

The electronic receipt generator 726 then formats the filtered electronic receipt. As used herein, "format" means to apply one or more algorithms to add data to a package such as a filtered electronic receipt. For example, the electronic receipt generator may apply one or more algorithms to add any one or more of special characters, images, and/or formatting instructions to the filtered electronic receipt.

In an implementation, the filtered electronic receipt contains a merchant ID, a print payload, a unique electronic receipt ID, and an electronic receipt generator ID. Prior to encryption, the filtered electronic receipt may contain all of some of the above-mentioned information. The electronic receipt generator 726 may encrypt all of some of this information. In one example, the electronic receipt generator 726 may encrypt the print payload and merchant ID.

At step J, the electronic receipt generator 726 then encrypts the filtered electronic receipt and optionally writes it onto an embedded tag 720. As used herein, "encrypt" means to apply one or more algorithms to cryptographically encode a package such as a formatted electronic receipt. For example, the electronic receipt generator may apply one or more algorithms such as a version of the Secure Hash Algorithm (SHA) combined with a cryptographic key to encrypt a formatted electronic receipt. In an implementation, the electronic receipt generator optionally transmits the resulting encrypted formatted electronic receipt to the embedded tag 720 using an NFC "write" technology. For example, a pamphlet with an embedded tag 720 may be placed in proximity to the electronic receipt generator 726 for the electronic receipt generator 726 to write onto the embedded tag 720.

In an implementation wherein the electronic receipt generator 726 writes the filtered electronic receipt onto an embedded tag 720, the encrypted filtered electronic receipt is made available for further transfer by the embedded tag 720. For example, the user may wish to obtain a receipt after submitting payment or otherwise, another user employing another user device (not depicted) may wish to obtain the receipt. The user may do so by interacting with the embedded tag (e.g., via tapping). As described above, the embedded tag 720 containing the encrypted filtered electronic receipt may be located on a pamphlet that is carried over to a user employing the user device 728. Otherwise, the embedded tag 720 may be located within an object (such as a statue, a paper weight, a painting, a candle holder, etc.) that is located in proximity to the user device 728 or the user can transport the user device 728 so that it's in the proximity to the tag 720.

Thus, when the user device 728 (or another user device) is held in proximity to the embedded tag 720 and the user device 728 interacts with the embedded tag 720 (e.g., the user taps or touches the embedded tag 720), the user device 728 receives the encrypted filtered electronic receipt via an embedded NFC read action on the user device 728. In an implementation wherein the electronic receipt generator 726 optionally does not write the filtered electronic receipt onto an embedded tag 720, the user device 728 receives the encrypted filtered electronic receipt from the application server 722 as described in steps M and N below. An embedded NFC read action occurs when the user device 728 reads the embedded tag 720 and the encrypted filtered electronic receipt is transferred to the user device 728. The encrypted filtered electronic receipt includes a merchant ID, a print payload, and/or unique ID associated with the electronic receipt generator 726 (such as a media access control (MAC) address associated with the electronic receipt generator). The unique ID may be unique to the electronic receipt generator 726.

At step K, the electronic receipt generator 726 transmits the encrypted filtered electronic receipt to the application server 722. The application server 722 stores the encrypted filtered electronic receipt on a storage device. For example, the encrypted filtered electronic receipt may be stored in one or more databases on one or more storage devices.

The application server 722 decrypts the print payload of the encrypted filtered electronic receipt to generate a decrypted electronic receipt. The application server 722 then formats the decrypted electronic receipt and stores it on the storage device. The formatting may include placing rich text and/or media including graphical data that includes images such as an image and/or logo associated with the merchant ID contained in the electronic receipt back onto the decrypted electronic receipt to generate a rich electronic receipt.

The application server 722 combines the data from the previously received and stored invoice and the rich electronic receipt. In an implementation, the application server 722 matches the stored invoice and the rich electronic receipt to one another based on a shared unique order ID.

At step L, the application server 722 transmits a notification to the user device 728 that the rich electronic receipt is ready for transmission to the user device 728.

At step M, the user device 728 transmits a request to the application server 722 to download the rich electronic receipt.

At step N, the application server 722 transmits the rich electronic receipt to the user device 728. Specifically, the application server 722 transmits the rich electronic receipt to a user application (not depicted) running on the user device 728.

A user employing user device 728 may then view the rich electronic receipt via a user application running on the user device 728. The rich electronic receipt may be presented as rich media on a display device of the user device 728.

The user may interact with the rich electronic receipt to obtain rewards, access surveys, provide reviews, and/or transmit the receipt to friends in order to split costs.

Figure 8:
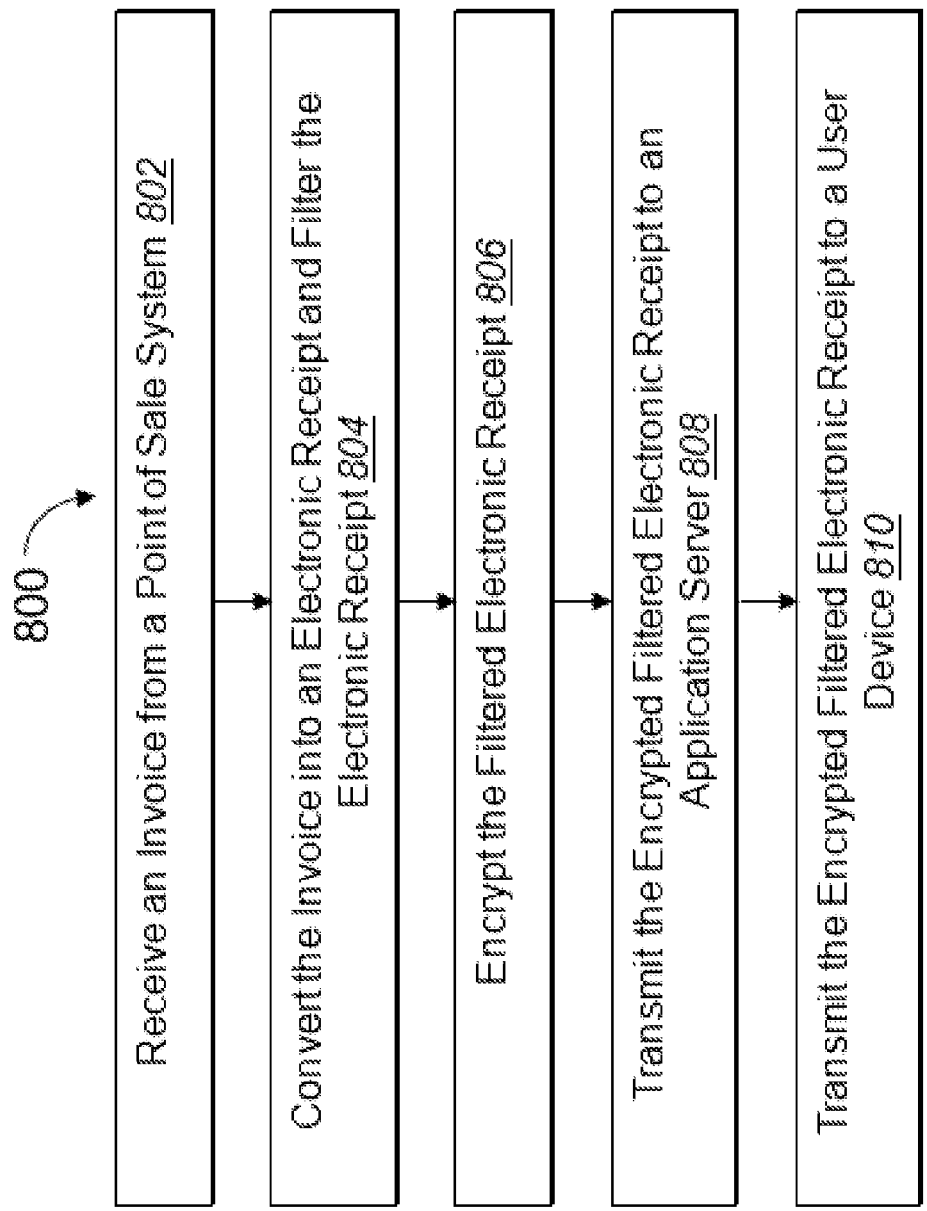
FIG. 8 is a flow diagram illustrating a method for receiving and transmitting an electronic receipt, according to an implementation of the disclosure.

FIG. 8 is a flow diagram illustrating a method 800 for receiving and transmitting an electronic receipt, according to an implementation of the disclosure. The method 800 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 800 may be performed by any of the electronic receipt generators described in this application. For example, electronic receipt generator 106, electronic receipt generator 206, electronic receipt generator 328, electronic receipt generator 606, electronic receipt generator 626, electronic receipt generator 706, and/or electronic receipt generator 726 depicted in FIGS. 1, 2, 3, 6A, 6B, 7A, and 7B, respectively, can perform the steps of method 800. Furthermore, any of POS systems, user devices and application servers may be in communication with a respective electronic receipt generator.

Referring to FIG. 8, method 800 begins at block 802 when the electronic receipt generator receives an invoice from a Point of Sale (POS) system. As described above, the electronic receipt generator may receive the invoice in the form of one or more packets containing a header and a payload. The invoice may contain details regarding a transaction that has been paid.

At block 804, the electronic receipt generator converts an invoice into an electronic receipt. In an implementation, the electronic receipt may be filtered to remove rich text and/or media including graphical data that includes images such as an image and/or logo associated with a merchant ID of a merchant that provides the POS system. Therefore, the electronic receipt generator may convert and filter to generate a filtered electronic receipt.

At block 806, the electronic receipt generator encrypts the filtered electronic receipt to generate an encrypted filtered electronic receipt.

At block 808, the electronic receipt generator transmits the encrypted filtered electronic receipt to an application server.

At block 810, the electronic receipt generator transmits the encrypted filtered electronic receipt obtained in block 804 to a user device.

Figure 9:
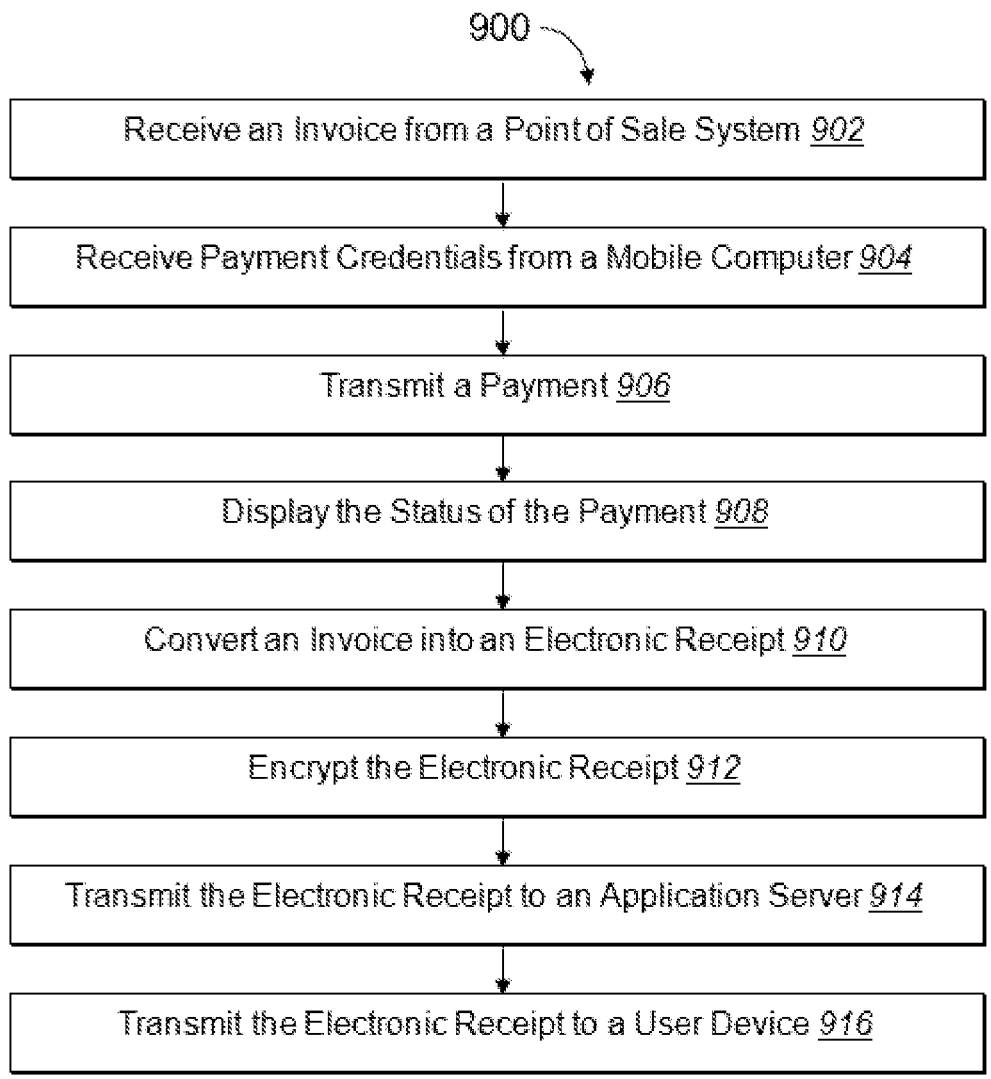
FIG. 9 is a flow diagram illustrating a method for generating and transmitting an electronic receipt, according to an implementation of the disclosure.

FIG. 9 is a flow diagram illustrating a method 900 for generating and transmitting an electronic receipt, according to an implementation of the disclosure. The method 900 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 900 may be performed by any of the electronic receipt generators described in this application. For example, electronic receipt generator 106, electronic receipt generator 206, electronic receipt generator 328, electronic receipt generator 606, electronic receipt generator 626, electronic receipt generator 706, and/or electronic receipt generator 726 depicted in FIGS. 1, 2, 3, 6A, 6B, 7A, and 7B, respectively, can perform the steps of method 800. Furthermore, any of POS systems, user devices and application servers may be in communication with a respective electronic receipt generator.

As illustrated, method 900 begins at block 902 when the electronic receipt generator receives order details from a Point of Sale (POS) system. For example, a server may generate enter order details for a client into a POS system to generate an invoice.

At block 904, the electronic receipt generator receives payment credentials from a user device. For example, a user operating a user device may input payment credentials for submitting payment to the electronic receipt generator via the user device.

At block 906, the electronic receipt generator transmits a payment. The electronic receipt generator may transmit payment to a payment processor via a network.

At block 908, the electronic receipt generator displays the status of the payment. For example, a monitor attached to or otherwise connected with the electronic receipt generator and/or POS system may display the status of the payment as "paid," or "unpaid" based on whether or not the payment was successful at block 906.

Assuming that the payment was successful, and the display lists the status of the payment as "paid," at block 910, the electronic receipt generator converts the invoice into an electronic receipt. In an implementation, the electronic receipt may be filtered to remove rich text and/or media including graphical data that includes images such as an image and/or logo associated with a merchant ID of a merchant that provides the POS system. Therefore, the electronic receipt generator may convert and filter to generate a filtered electronic receipt.

At block 912, the electronic receipt generator encrypts the electronic receipt to generate an encrypted electronic receipt.

At block 914, the electronic receipt generator transmits the encrypted electronic receipt to an application server.

At block 916, the electronic receipt generator transmits the encrypted electronic receipt to a user device.

Figure 10:
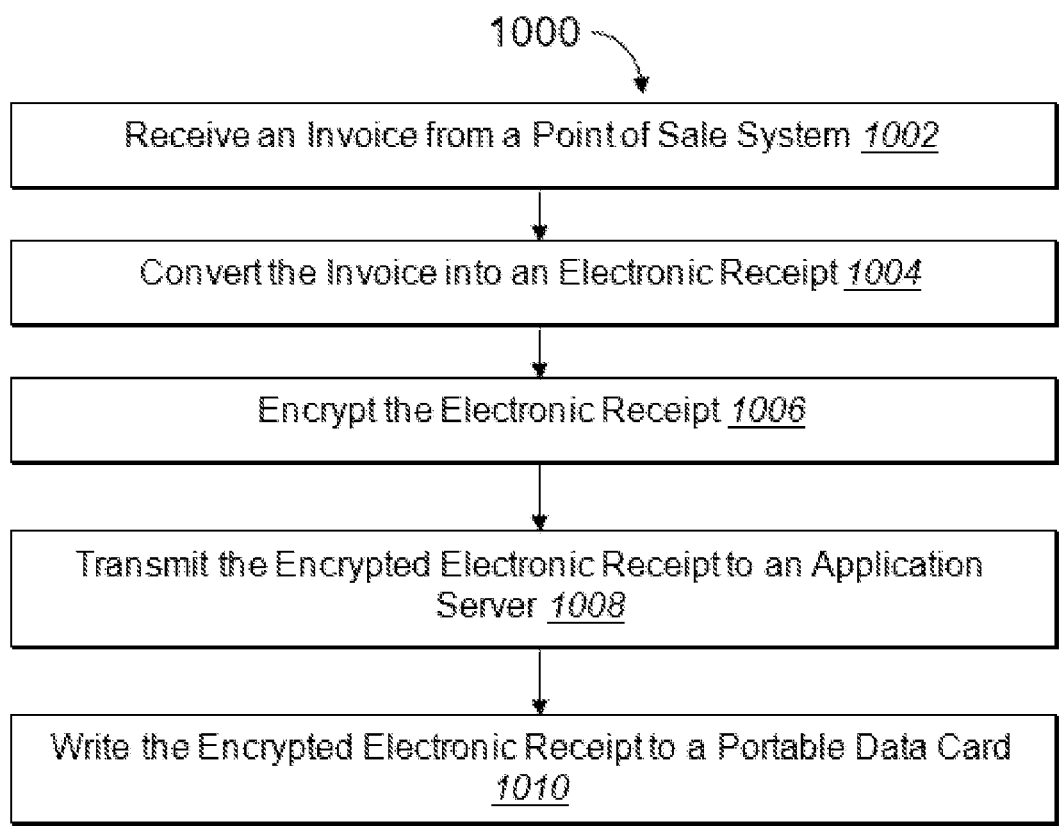
FIG. 10 is a flow diagram illustrating a method for generating an electronic receipt and writing the electronic receipt into a portable data card, according to an implementation of the disclosure.

FIG. 10 is a flow diagram illustrating a method 1000 for generating an electronic receipt and writing the electronic receipt into a portable data card, according to an implementation of the disclosure. The method 1000 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1000 may be performed by any of the electronic receipt generators described in this application. For example, electronic receipt generator 106, electronic receipt generator 206, electronic receipt generator 328, electronic receipt generator 606, electronic receipt generator 626, electronic receipt generator 706, and/or electronic receipt generator 726 depicted in FIGS. 1, 2, 3, 6A, 6B, 7A, and 7B, respectively, can perform the steps of method 1000. Furthermore, any of POS systems, user devices and application servers may be in communication with a respective electronic receipt generator.

As illustrated, method 1000 begins at block 1002 when the electronic receipt generator receives an invoice from a Point of Sale (POS) system. For example, a server may generate enter order details for a client into a POS system to generate an invoice.

At block 1004, the electronic receipt generator converts the invoice into an electronic receipt. In an implementation, the electronic receipt may be filtered to remove rich text and/or media including graphical data that includes images such as an image and/or logo associated with a merchant ID of a merchant that provides the POS system. Therefore, the electronic receipt generator may convert and filter to generate a filtered electronic receipt.

At block 1006, the electronic receipt generator encrypts electronic receipt to generate an encrypted electronic receipt.

At step 1008, the electronic receipt generator transmits the encrypted electronic receipt to an application server.

At step 1010, the electronic receipt generator writes the encrypted electronic receipt to a portable data card.

Figure 11:
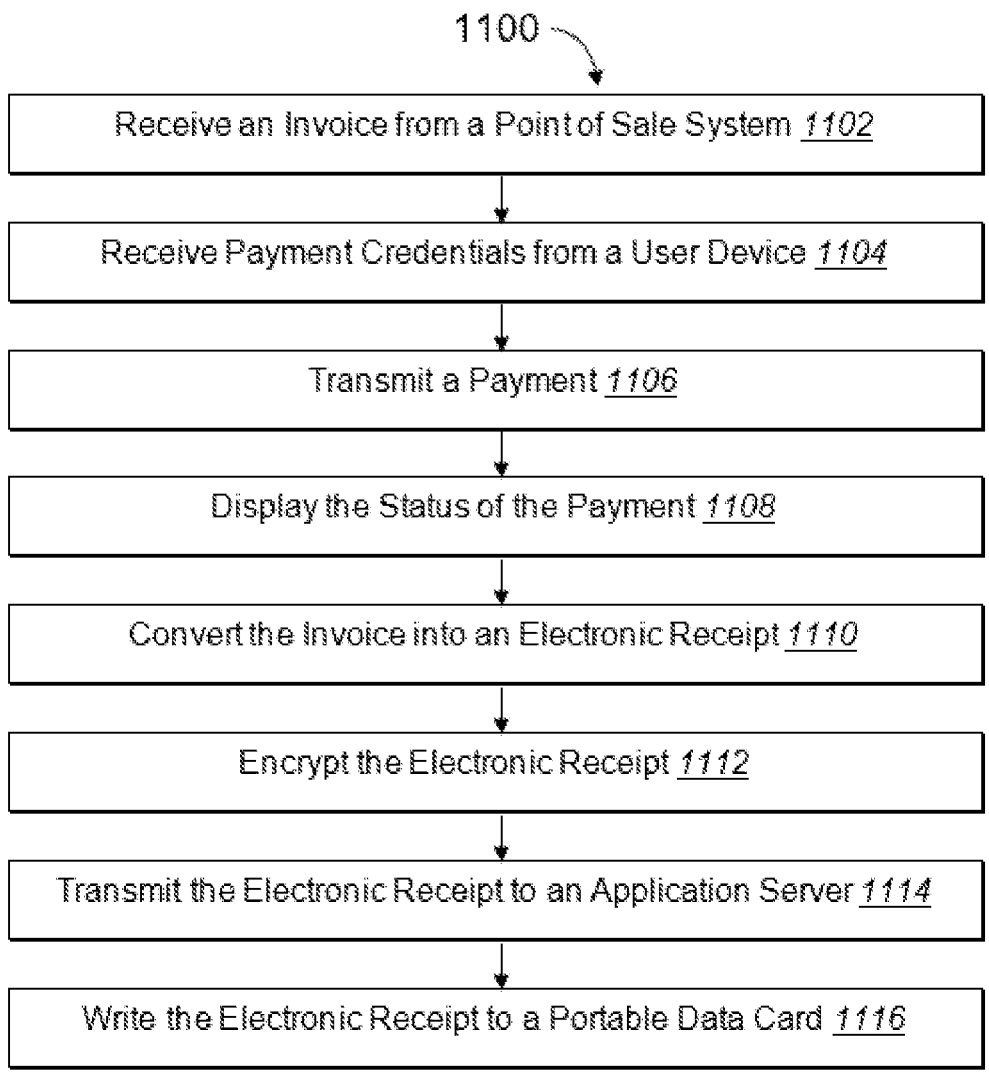
FIG. 11 is a flow diagram illustrating a method for generating an electronic receipt and writing the electronic receipt into a portable data card, according to an implementation of the disclosure.

FIG. 11 is a flow diagram illustrating a method 1100 for generating an electronic receipt and writing the electronic receipt into a portable data card, according to an implementation of the disclosure. The method 1100 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1100 may be performed by any of the electronic receipt generators described in this application. For example, electronic receipt generator 106, electronic receipt generator 206, electronic receipt generator 328, electronic receipt generator 606, electronic receipt generator 626, electronic receipt generator 706, and/or electronic receipt generator 726 depicted in FIGS. 1, 2, 3, 6A, 6B, 7A, and 7B, respectively, can perform the steps of method 1100. Furthermore, any of POS systems, user devices and application servers may be in communication with a respective electronic receipt generator.

As illustrated, method 1100 begins at block 1102 when the electronic receipt generator receives order details from a Point of Sale (POS) system. For example, a server may generate enter order details for a client into a POS system to generate an invoice.

At block 1104, the electronic receipt generator receives payment credentials from a user device. For example, a user operating a user device may input payment credentials for submitting payment to the electronic receipt generator via the user device.

At block 1106, the electronic receipt generator transmits a payment. The electronic receipt generator may transmit payment to a payment processor via a network.

At block 1108, the electronic receipt generator displays the status of the payment. For example, a monitor attached to or otherwise connected with the electronic receipt generator and/or POS system may display the status of the payment as "paid," or "unpaid" based on whether or not the payment was successful at block 1106.

Assuming that the payment was successful, and the display lists the status of the payment as "paid," at block 1110, the electronic receipt generator converts the invoice into an electronic receipt. In an implementation, the electronic receipt may be filtered to remove rich text and/or media including graphical data that includes images such as an image and/or logo associated with a merchant ID of a merchant that provides the POS system. Therefore, the electronic receipt generator may convert and filter to generate a filtered electronic receipt.

At block 1112, the electronic receipt generator encrypts electronic receipt to generate an encrypted electronic receipt.

At block 1114, the electronic receipt generator transmits the encrypted electronic receipt to an application server.

At block 1116, the electronic receipt generator writes the encrypted electronic receipt to a portable data card.

Figure 12:
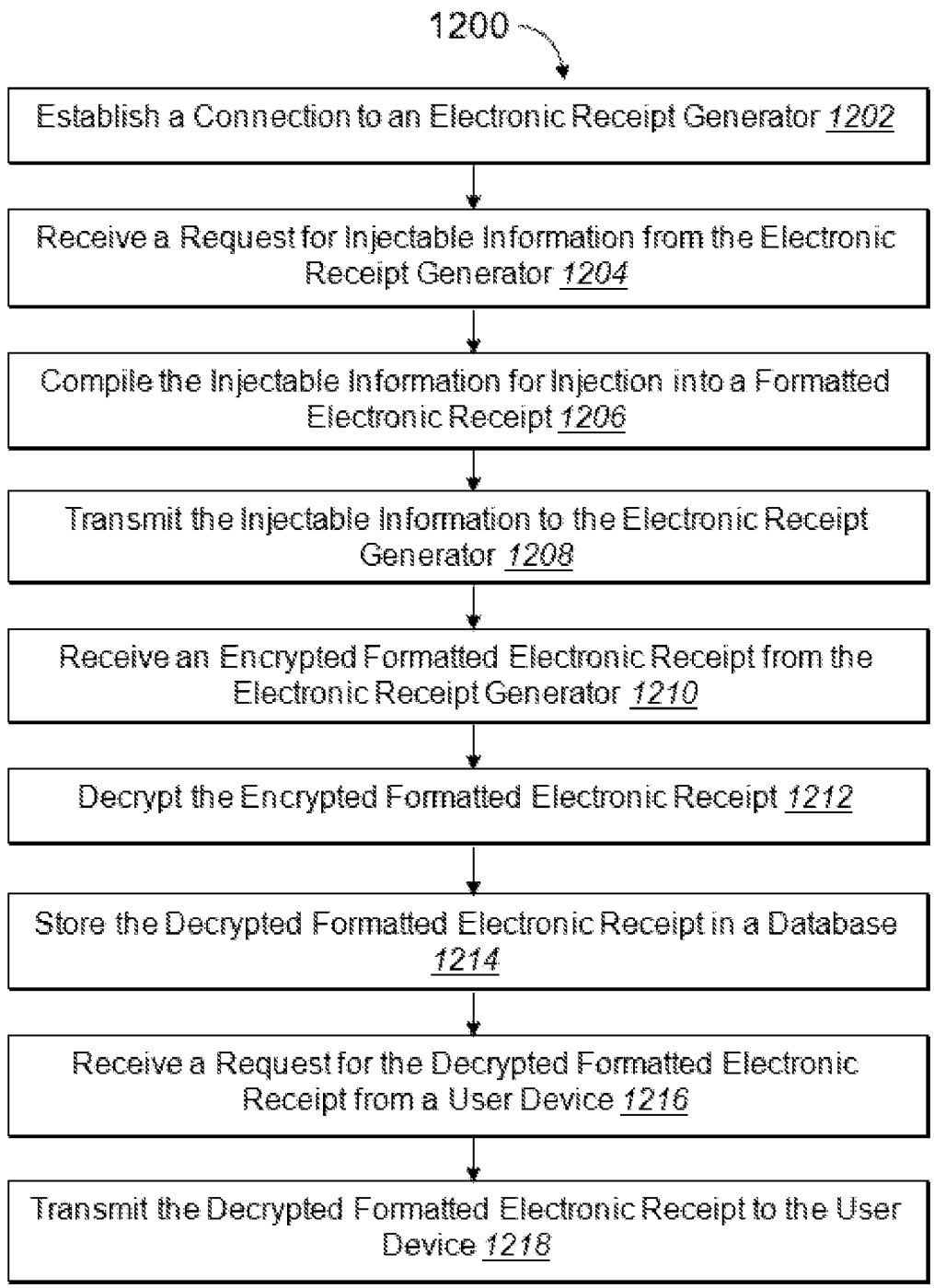
FIG. 12 is a flow diagram illustrating a method to provide a receipt to a user device via an application server, according to an implementation of the disclosure.

FIG. 12 is a flow diagram illustrating a method 1200 to provide a receipt to a user device via an application server, according to an implementation of the disclosure. The method 1200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 1200 may be performed by any of the application servers described in this application. For example, application server 112, application server 212, application server 612, application server 622, application server 712 and/or application server 722 depicted in FIGS. 1, 2, 6A, 6B, 7A, and 7B, respectively, can perform the steps of method 1200. Furthermore, any of POS systems, user devices and electronic receipt generators may be in communication with a respective application server.

As illustrated, method 1200 begins at block 1202 when the application server establishes a connection to an electronic receipt generator using a message protocol. For example, an application server may establish a connection over Hypertext Transfer Protocol (HTTP) or another message protocol.

Assuming the connection is successful, at block 1204 the application server receives a request for injectable information from the electronic receipt generator over the connection. In an implementation, the request for injectable information includes unique identifying information for the electronic receipt generator and unique identifying information for the user device.

At block 1206, the application server compiles the injectable information for injection into a formatted electronic receipt. In an implementation, the application server compiles injectable information using the unique identifying information for the electronic receipt generator and the unique identifying information for the user device. In an implementation, the injectable information includes merchant specifications for injection into a formatted electronic receipt by an electronic receipt generator.

In an implementation, the application server compiles the injectable information according to a set of machine instructions. The machine instructions may use information supplied by the user device and/or the electronic receipt generator as well as information stored in a data store. Unique identifying information for the electronic receipt generator and unique identifying information for the user device may be incorporated in the machine instructions to apply a filter or sort. The output of the machine instructions may be a plurality of promotional content tailored to the user device, such as ads, promotions, coupons, etc. In an implementation, the output of the machine instructions also includes a plurality of instructions to format an electronic receipt.

The machine instructions to compile injectable information may be a static algorithm or a dynamic algorithm. In an implementation, the machine instructions to compile injectable information are generated using a machine learning process. "Machine learning" as used herein means a method of optimizing a mathematical algorithm for some purpose using an iterative approach. Any suitable machine learning algorithm may be used to generate the machine instructions to compile injectable information. In an implementation, a plurality of nodes is each defined by a set of parameters including inputs, outputs, weighting factors, and an operating function. A grouping of nodes may constitute an "input layer," one or more "hidden layers," and an "output layer."

By adjusting the parameters of one or more nodes, the output of the machine instructions may be iteratively optimized to a desired result.

At block 1208, the application server transmits the injectable information to the electronic receipt generator using the connection.

Assuming the electronic receipt generator receives the injectable information and in response to the electronic receipt generator encrypting a formatted electronic receipt to generate and transmit an encrypted formatted electronic receipt, at block 1210, the application server receives an encrypted formatted electronic receipt from the electronic receipt generator.

At block 1212, the application server decrypts the encrypted formatted electronic receipt to generate a decrypted formatted electronic receipt.

At block 1214, the application server stores the decrypted formatted electronic receipt in a database or other data store for later retrieval.

At block 1216, the application server receives a request for the decrypted formatted electronic receipt from a user device. In an implementation, the request for the decrypted formatted electronic receipt includes unique identifying information for the electronic receipt generator and unique identifying information for the user device.

At block 1218, the application server transmits the decrypted formatted electronic receipt to the user device in a format to allow the user device to display the decrypted formatted electronic receipt via a graphical user interface as requested.

Features depicted in one figure may apply to other figures that may not depict such features.

Figure 13:
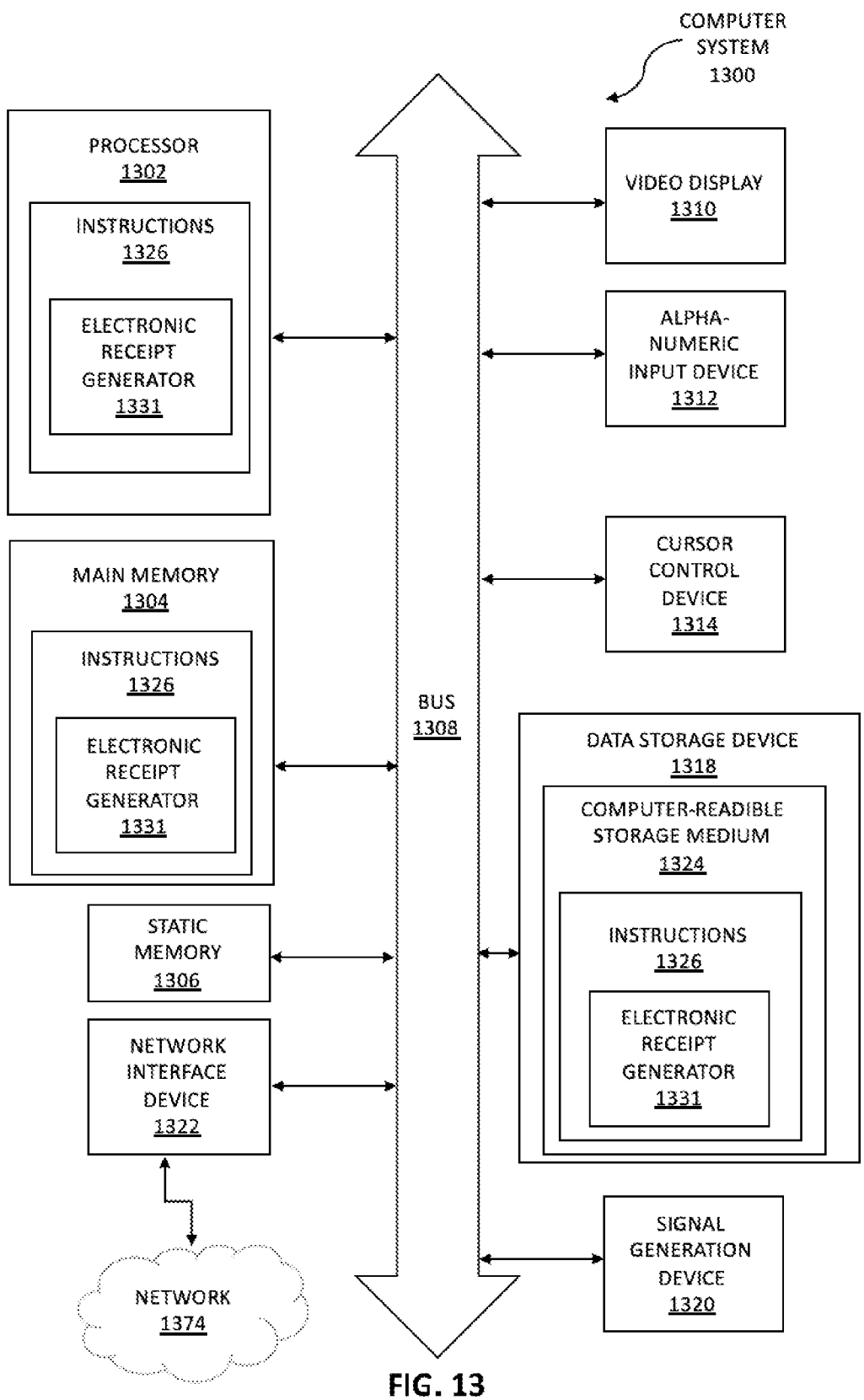
FIG. 13 illustrates a diagrammatic representation of a machine in the exemplary form of a computer system within which a set of instructions, for causing the machine to perform any one or more of the methodologies discussed herein, may be executed.

FIG. 13 illustrates a diagrammatic representation of a machine in the exemplary form of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1300 includes a processing device (processor) 1302, a main memory 1304 (e.g., read-only memory (ROM), flash memory, dynamic random-access memory (DRAM) such as synchronous DRAM (SDRAM) or Rambus DRAM (RDRAM), etc.), a static memory 1306 (e.g., flash memory, static random-access memory (SRAM), etc.), and a data storage device 1318, which communicate with each other via a bus 1308.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1302 is configured to execute instructions 1326 for performing the operations and steps discussed herein.

The computer system 1300 may further include a network interface device 1322. The computer system 1300 also may include a video display unit 1310 (e.g., a liquid crystal display (LCD), light-emitting diode (LED), a cathode ray tube (CRT), or a touch screen), an alphanumeric input device 1312 (e.g., a keyboard), a cursor control device 1314 (e.g., a mouse), and a signal generation device 1320 (e.g., a speaker).

The data storage device 1318 may include a computer-readable storage medium 1324 on which is stored one or more sets of instructions 1326 (e.g., software) embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting computer-readable storage media. The instructions 1326 may further be transmitted or received over a network 1374 via the network interface device 1322.

In one implementation, the instructions 1326 include instructions for implementing an electronic receipt generator 1331. The electronic receipt generator 1331 may be any electronic receipt generator described above (e.g., electronic receipt generator 106 in FIG. 1, electronic receipt generator 206 in FIG. 2, electronic receipt generator 328 in FIG. 3, electronic receipt generator 606 in FIG. 6A, electronic receipt generator 626 in FIG. 6B, electronic receipt generator 706 in FIG. 7A, and/or electronic receipt generator 726 in FIG. 7B) While the computer-readable storage medium 1324 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 14:
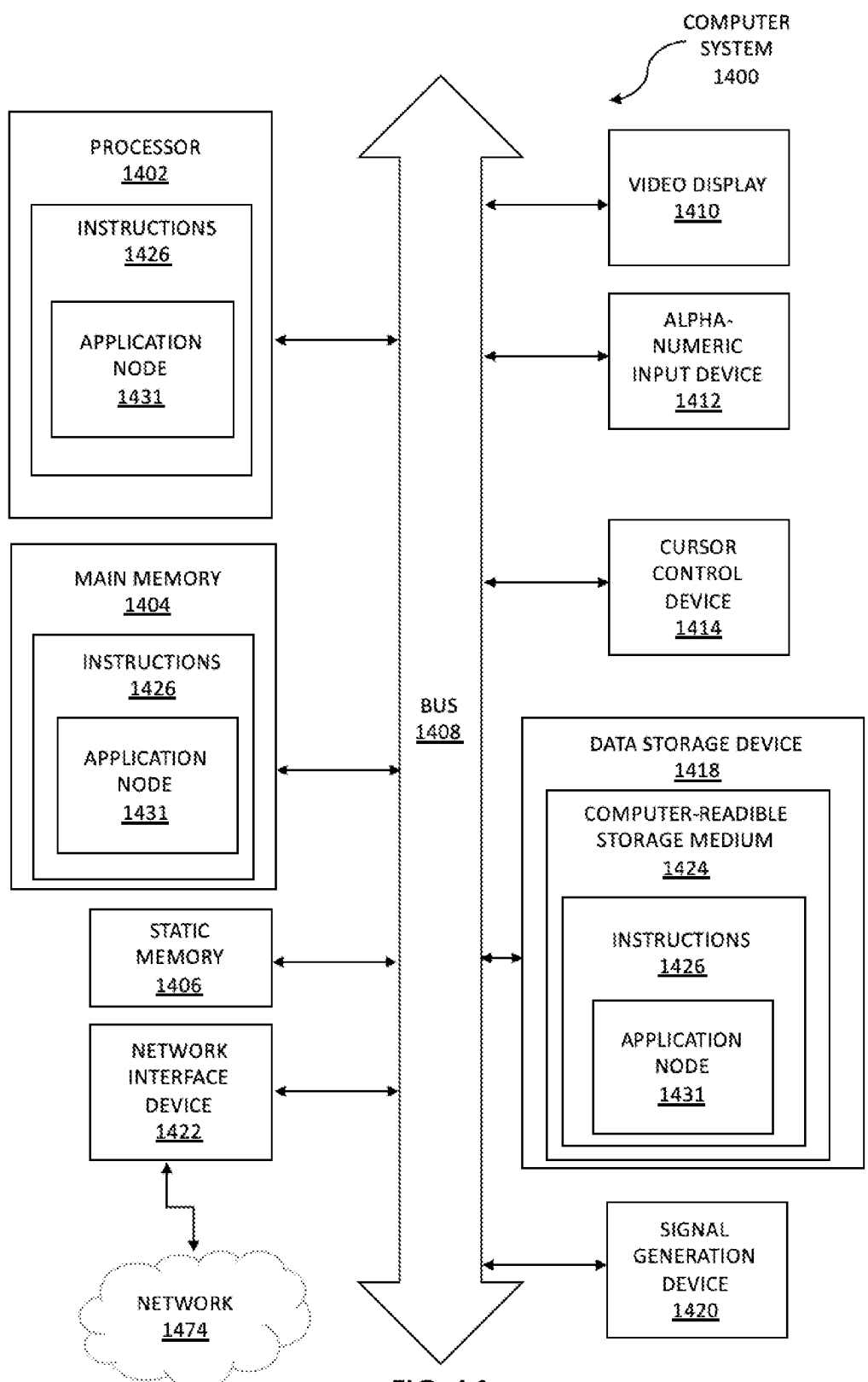
FIG. 14 illustrates a diagrammatic representation of a machine in the exemplary form of a computer system within which a set of instructions, for causing the machine to perform any one or more of the methodologies discussed herein, may be executed.

FIG. 14 illustrates a diagrammatic representation of a machine in the exemplary form of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1400 includes a processing device (processor) 1402, a main memory 1404 (e.g., read-only memory (ROM), flash memory, dynamic random-access memory (DRAM) such as synchronous DRAM (SDRAM) or Rambus DRAM (RDRAM), etc.), a static memory 1406 (e.g., flash memory, static random-access memory (SRAM), etc.), and a data storage device 1418, which communicate with each other via a bus 1408.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute instructions 1426 for performing the operations and steps discussed herein.

The computer system 1400 may further include a network interface device 1422. The computer system 1400 also may include a video display unit 1410 (e.g., a liquid crystal display (LCD), light-emitting diode (LED), a cathode ray tube (CRT), or a touch screen), an alphanumeric input device 1412 (e.g., a keyboard), a cursor control device 1414 (e.g., a mouse), and a signal generation device 1420 (e.g., a speaker).

The data storage device 1418 may include a computer-readable storage medium 1424 on which is stored one or more sets of instructions 1426 (e.g., software) embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting computer-readable storage media. The instructions 1426 may further be transmitted or received over a network 1474 via the network interface device 1422.

In one implementation, the instructions 1426 include instructions for implementing an application node 1431. The application node 1431 may be any application node described above (e.g., application node 114 in FIG. 1 and/or application node 214 in FIG. 2) While the computer-readable storage medium 1424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "sending," "determining," "identifying," "presenting," "generating," "associating," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

While the implementations are susceptible to various modifications and alternative forms, specific examples thereof have been shown in the drawings and are herein described in detail. It should be understood, however, that these implementations are not to be limited to the particular form disclosed, but to the contrary, these implementations are to cover all modifications, equivalents, and alternatives falling within the spirit of the disclosure. Furthermore, any features, functions, steps, or elements of the implementations may be recited in or added to the claims, as well as negative limitations that define the inventive scope of the claims by features, functions, steps, or elements that are not within that scope.

What is claimed is:

1. A receipt generator apparatus to provide a receipt to a user device, the receipt generator apparatus comprising:
    a receiving unit to receive an invoice comprising receipt information from a Point of Sale system;
    a filter unit to filter out a portion of the receipt information from the invoice using a filter to generate a filtered electronic receipt;
    a formatting unit to request injectable information from an application server and inject the injectable information into the filtered electronic receipt to generate a formatted electronic receipt;
    an encrypting unit to encrypt the formatted electronic receipt to generate an encrypted formatted electronic receipt;
    a transmitting unit to transmit the encrypted formatted electronic receipt to the application server;
    a data transfer unit to transmit the encrypted formatted electronic receipt to the user device in response to a request from the user device, and
    a portable data card configured to receive data from the data transfer unit using a contactless data transfer technology, wherein the portable data card is configured to be transferrable to the user device.

2. The receipt generator apparatus of claim 1, wherein the data transfer unit is configured to transmit the encrypted formatted electronic receipt to the user device using a contactless data transfer technology.

3. The receipt generator apparatus of claim 2, wherein the contactless data transfer technology is Near Field Communication.

4. The receipt generator apparatus of claim 1, wherein the transmitting unit is configured to transmit the encrypted formatted electronic receipt to the application server using a message protocol.

5. The receipt generator apparatus of claim 4, wherein the message protocol is Message Queuing Telemetry Transport.

6. The receipt generator apparatus of claim 4, wherein the message protocol is Hypertext Transfer Protocol.

7. The receipt generator apparatus of claim 1, further comprising:
    a printing unit configured to print a physical copy of the formatted electronic receipt.

8. The receipt generator apparatus of claim 1, wherein the injectable information comprises a plurality of custom promotional information tailored to the user device.

9. The receipt generator apparatus of claim 1, wherein the injectable information comprises a set of instructions to format an electronic receipt.

10. The receipt generator apparatus of claim 1, wherein the transmitting unit is further configured to transmit the encrypted formatted electronic receipt to the Point of Sale system.

11. The receipt generator apparatus of claim 1, further comprising:
    a data storage unit configured to at least temporarily store an encrypted formatted electronic receipt in response to a failure of the transmitting unit.

* * * * *